United States Patent
Brunner et al.

(10) Patent No.: US 10,941,279 B2
(45) Date of Patent: *Mar. 9, 2021

(54) SURFACE-TREATED FILLERS FOR ULTRATHIN BREATHABLE FILMS

(71) Applicant: OMYA INTERNATIONAL AG, Oftringen (CH)

(72) Inventors: Martin Brunner, Wallbach (CH); Tazio Fornera, Zofingen (CH); Michael Knerr, Oftringen (CH); Michael Tinkl, Gipf-Oberfrick (CH); Marcus Unger, Dombühl (DE)

(73) Assignee: OMYA INTERNATIONAL AG, Oftringen (CH)

( * ) Notice: Subject to any disclaimer, the term of this patent is extended or adjusted under 35 U.S.C. 154(b) by 282 days.

This patent is subject to a terminal disclaimer.

(21) Appl. No.: 15/781,024

(22) PCT Filed: Nov. 11, 2016

(86) PCT No.: PCT/EP2016/077406
§ 371 (c)(1),
(2) Date: Jun. 1, 2018

(87) PCT Pub. No.: WO2017/093003
PCT Pub. Date: Jun. 8, 2017

(65) Prior Publication Data
US 2020/0270424 A1 Aug. 27, 2020

Related U.S. Application Data

(60) Provisional application No. 62/264,893, filed on Dec. 9, 2015.

(30) Foreign Application Priority Data

Dec. 2, 2015 (EP) .................................. 15197670

(51) Int. Cl.
| | | |
|---|---|---|
| *C08K 9/04* | (2006.01) | |
| *C08J 5/18* | (2006.01) | |
| *C08K 3/26* | (2006.01) | |
| *C08K 5/09* | (2006.01) | |
| *C08L 23/06* | (2006.01) | |
| *C08L 23/12* | (2006.01) | |

(52) U.S. Cl.
CPC ...... *C08K 9/04* (2013.01); *C08J 5/18* (2013.01); *C08K 3/26* (2013.01); *C08K 5/09* (2013.01); *C08L 23/06* (2013.01); *C08L 23/12* (2013.01); *C08J 2323/06* (2013.01); *C08J 2323/12* (2013.01); *C08J 2423/06* (2013.01); *C08J 2423/12* (2013.01); *C08K 2003/265* (2013.01); *C08L 2205/025* (2013.01); *C08L 2207/066* (2013.01)

(58) Field of Classification Search
CPC ... C08K 9/04; C08K 3/26; C08K 5/09; C08K 2003/265; C08K 9/02; C08K 2201/005; C08K 2201/006; C08K 9/08; C08J 5/18; C08J 2323/06; C08J 2323/12; C08J 2423/06; C08J 2423/12; C08J 2323/08; C08L 23/12; C08L 23/06; C08L 2205/025; C08L 2207/066; D04H 3/007; C09C 1/02; C09C 1/021; B29D 7/01; B65D 65/00; B32B 27/00

USPC ............................................................ 523/210
See application file for complete search history.

(56) References Cited

U.S. PATENT DOCUMENTS

| | | |
|---|---|---|
| 3,897,519 A | 7/1975 | Hogberg et al. |
| 4,126,650 A | 11/1978 | Via et al. |
| 4,350,645 A | 9/1982 | Kurosaki |
| 4,407,986 A | 10/1983 | Nomura et al. |
| 4,520,073 A | 5/1985 | Randolph et al. |
| 4,921,990 A | 5/1990 | Uphues et al. |
| 5,554,781 A | 9/1996 | Reierson |
| 6,096,014 A * | 8/2000 | Haffner ............... A61L 15/18 264/41 |
| 6,682,775 B2 * | 1/2004 | Calhoun ............... C09C 1/02 427/215 |

(Continued)

FOREIGN PATENT DOCUMENTS

| | | |
|---|---|---|
| DE | 958 830 | 2/1957 |
| EP | 0 998 522 | 5/2000 |

(Continued)

OTHER PUBLICATIONS

International Search Report and Written Opinion dated Jan. 18, 2017 in corresponding International Patent Application No. PCT/EP2016/077406, filed Nov. 11, 2016, 13 pages.

(Continued)

*Primary Examiner* — Hannah J Pak
(74) *Attorney, Agent, or Firm* — Dentons. US LLP

(57) ABSTRACT

A breathable film is described having a basis weight from 1 g/m² to 10 g/m², a process for producing the breathable film and use of a surface-treated filler material product as filler in the breathable film. Finally, an article is described that includes the breathable film as well as the use of the breathable film in hygienic applications, medical applications, healthcare applications, filtration materials, geotextile products, agricultural applications, horticultural applications, clothing, footwear products, baggage products, household applications, industrial applications, packaging applications, building applications, or construction.

40 Claims, 4 Drawing Sheets

(56) References Cited

U.S. PATENT DOCUMENTS

| | | |
|---|---|---|
| 6,686,044 B2 | 2/2004 | Nakai et al. |
| 6,710,199 B2 | 3/2004 | Tsuyutani et al. |
| 6,787,575 B1 | 9/2004 | Fichou et al. |
| 7,300,974 B2 | 11/2007 | Blanchard et al. |
| 7,312,258 B2 | 12/2007 | Hoppler et al. |
| 8,460,510 B2 | 6/2013 | Gane et al. |
| 10,287,407 B2 * | 5/2019 | Brunner ............ C08J 5/18 |
| 2002/0102404 A1 | 8/2002 | Nakai et al. |
| 2004/0097616 A1 | 5/2004 | Hoppler et al. |
| 2007/0197707 A1 | 8/2007 | Hoppler et al. |
| 2012/0031576 A1 | 2/2012 | Gane et al. |
| 2020/0190286 A1 * | 6/2020 | Brunner ............ C09C 1/021 |

FOREIGN PATENT DOCUMENTS

| | | |
|---|---|---|
| EP | 1 375 579 | 1/2004 |
| EP | 1 092 000 | 9/2004 |
| EP | 1 980 588 | 10/2008 |
| EP | 2 070 991 | 6/2009 |
| EP | 2 159 258 | 3/2010 |
| EP | 2 264 108 | 12/2010 |
| EP | 2 264 109 | 12/2010 |
| EP | 2 390 280 | 11/2011 |
| EP | 2 390 285 | 11/2011 |
| EP | 2 722 368 | 4/2014 |
| EP | 2 770 017 | 8/2014 |
| EP | 2 975 078 | 1/2016 |
| GB | 2 336 366 | 10/1999 |
| JP | 10-237200 A | 9/1998 |
| JP | 2005-511838 A | 4/2005 |
| JP | 2014-19784 A | 2/2014 |
| WO | 99/61521 | 12/1999 |
| WO | 00/00553 | 1/2000 |
| WO | 00/20336 | 4/2000 |
| WO | 01/32787 | 5/2001 |
| WO | 02/55596 | 7/2002 |
| WO | 03/050167 | 6/2003 |
| WO | 2005/075353 | 8/2005 |
| WO | 2008/023076 | 2/2008 |
| WO | 2008/077156 | 6/2008 |
| WO | 2009/074492 | 6/2009 |
| WO | 2009/094321 | 7/2009 |
| WO | 2011/028934 | 3/2011 |
| WO | 2012/052778 | 4/2012 |
| WO | 2013/190274 | 12/2013 |
| WO | 2014/060286 | 4/2014 |
| WO | 2015/175593 A1 | 11/2015 |

OTHER PUBLICATIONS

Skoog, Holler, Nieman, Principles of Instrumental analysis, 5th Edition, Chapter 31, pp. 798-800 (1998).

Japanese Office Action dated Oct. 6, 2020 in corresponding Japan Patent Application No. 2018-529171 and English translation, 6 pages.

* cited by examiner

SURFACE-TREATED FILLERS FOR ULTRATHIN BREATHABLE FILMS

CROSS-REFERENCE TO PRIOR APPLICATIONS

This application is a National Stage of PCT/EP2016/077406, filed Nov. 11, 2016, and designating the United States (published on Jun. 8, 2017, as WO 2017/093003 A1), which claims priority under 35 U.S.C. § 119 to European Patent Application No. 15197670.1, filed Dec. 2, 2015, and under 35 U.S.C. § 120 to Provisional Application No. 62/264,893, filed Dec. 9, 2015, each hereby expressly incorporated by reference in its entirety and each assigned to the assignee hereof.

The present invention relates to a breathable film having a basis weight from 1 to 10 g/m$^2$, a process for producing the breathable film, the use of a surface-treated filler material product as filler in the breathable film, an article comprising the breathable film as well as the use of the breathable film in hygienic applications, medical applications, healthcare applications, filtration materials, geotextile products, agricultural applications, horticultural applications, clothing, footwear products, baggage products, household applications, industrial applications, packaging applications, building applications, or construction.

The first breathable films for hygiene products were developed as early as 1983 in Japan. Production of breathable films began in the USA in the mid 1990s and later in Europe, where they rapidly commanded a large market share. Currently, breathable films have two main fields of application: personal hygiene products, such as infant diapers, feminine hygiene pads (napkins, panty liners) or adult incontinence products, and construction industry, such as under-roofing membranes, house wraps or wall coverings. However, the specific permeability properties of these films also have uses in other industries, such as disposable clothing in medical and industrial applications.

Breathable films typically comprise a blend of thermoplastic polymers and an inorganic filler such as calcium carbonate and are produced by forming a film from said blend by casting or blowing with subsequent stretching of the film. The stretching process delaminates the polymer from the surface of the inorganic filler particles, which produces micropores, often referred to as "voids" in the film's cross section, which allows the passage of water vapour during end-use.

A problem encountered with the use of inorganic mineral fillers is the presence of volatiles associated with the mineral fillers. Such volatiles may evolve at temperatures reached during the application of the fillers and may lead to the degradation of the quality of the final mineral-comprising polymer product during the processing of such mineral filler-comprising products. Moreover, such associated volatiles may lead to a reduction in the tensile and tear strength of a breathable film, and may degrade its visible aspects, in particular its visible uniformity. Volatiles can also generate excessive foaming of the mineral filled polymer melt during a step of compounding, causing unwanted product build-up at the vacuum extraction and hence, forcing a reduced output rate.

Said volatiles may, for example, be inherently associated with the mineral filler ("inherent volatiles"), and are especially associated water, and/or may be introduced during the treatment of the mineral filler ("added volatiles"), for example, to render the mineral filler more dispersible within a plastic medium. Furthermore, volatiles may be generated by the reaction of inherent organic materials and/or added organic materials with the mineral filler, whereas such reactions may especially be induced or enhanced by the temperatures reached during the introduction and/or processing of the filled polymeric material, for example, during the extrusion or compounding process. Said volatiles may also be generated by the degradation of inherent organic materials and/or added organic materials, forming $CO_2$, water and possibly low molecular mass fractions of these organic materials. Such a degradation may especially be induced or enhanced by the temperatures reached during the introduction and/or processing of the polymeric material comprising the treated mineral filler, such as during the extrusion or compounding process.

One obvious means to increase the volatile onset temperature and to limit the quantity of volatiles associated with a mineral filler is to avoid or limit the use of certain common filler treatment additives.

However, often, as in the case when a mineral filler is applied in a plastic application, such additives are needed to ensure other functions. For example, in order to obtain uniform distribution barrier and vapour transmission properties throughout the film it is required to have the filler as equally distributed throughout the film as possible. Therefore, usually additives are introduced to provide the mineral filler with a hydrophobic coating and to improve the dispersability of the mineral filler in the film precursor material as well as possibly to improve the processability of this film precursor material and/or properties of the final application products. An elimination of such additives would unacceptably compromise the resulting film quality.

In the art, several attempts have been made to improve the applicability of mineral filler materials and especially calcium carbonate-comprising mineral filler materials, e.g. by treating such mineral filler materials with aliphatic carboxylic acids, and aliphatic carboxylic acid salts, which in some cases may also be referred to as fatty acids and fatty acid salts. For instance, WO 00/20336 relates to an ultrafine natural calcium carbonate, which may optionally be treated with one or several fatty acids or one or several salts or mixtures thereof, and which is used as a rheology regulator for polymer compositions.

Likewise, U.S. Pat. No. 4,407,986 A relates to a precipitated calcium carbonate that is surface-treated with a dispersant that may include higher aliphatic acids and their metal salts in order to limit the addition of lubricant additives when kneading this calcium carbonate with crystalline polypropylene and to avoid the formation of calcium carbonate aggregates that limit the impact strength of the polypropylene.

EP 0 998 522 A1 relates to a surface-treated calcium carbonate filler for breathable films using fatty acids of at least 10 carbon atoms wherein the filler before and after the treatment process has to be mostly free of moisture in the range of below 0.1 wt.-%. However, to achieve and maintain such low moisture content, a high consumption of energy and costs is required. Thus, such low moisture content is not the ideal parameter for influencing and controlling the reaction of a solid mineral surface with treatment additives to achieve a good quality of surface-treated filler material product at low energy costs.

DeArmitt et al., Improved thermoplastic composites by optimised surface treatment of the mineral fillers, Institute for Surface Chemistry, August 2000, describes a wet treatment process in which a batch suspension comprising a mineral filler material is contacted with a dispersant at room temperature for one hour. However, such wet treatment process has the disadvantage that the wetting of a dry product for treatment and the subsequent drying is energy- and cost-consuming.

US 2002/0102404 A1 describes dispersible calcium carbonate particles coated on their surface with a combination of saturated and unsaturated fatty carboxylic acids and salts thereof along with an organic compound such as a phthalic ester, which are used in adhesive compositions to improve viscosity stability and adhesion properties. However, US 2002/0102404 requires the implementation of a mixture of saturated and unsaturated aliphatic carboxylic acids/salts. The presence of unsaturated aliphatic carboxylic acids/salts increases the risk of unwanted in situ side reactions with the double bond during processing of any unsaturated aliphatic carboxylic acid/salt-comprising material. Additionally, the presence of unsaturated aliphatic carboxylic acids/salts may result in discoloration of, or unwanted odour development, and notably rancid odours, in the material in which they are implemented.

U.S. Pat. No. 4,520,073 A describes mineral filler materials with improved hydrophobic coatings prepared by pressure coating of porous minerals using steam as a carrier for the coating material. Said coating material may be selected, among other options, from long chain aliphatic fatty acids and their salts.

WO 01/32787 A1 describes a particulate alkaline earth metal carbonate material product which has on its particles a coating of hydrophobic material comprising a composition formed of (a) a first component which comprises the reaction product of the alkaline earth metal carbonate and at least one given aliphatic carboxylic acid and of (b) a second component having a carbonate release temperature substantially higher than the first component comprises a compound of formula $CH_3(CH_2)_m COOR$.

WO 2008/077156 A2 relates to spunlaid fibres comprising at least one polymeric resin and at least one filler having an average particle size of less than or equal to about 5 micrometres and/or having a top cut of less than about 15 micrometres, wherein the at least one filler is present in an amount of less than about 40% by weight, relative to the total weight of the spunlaid fibres. The coating of the filler is described as being at least one organic material chosen from fatty acids and salts and esters thereof, e.g. stearic acid, stearate, ammonium stearate and calcium stearate.

WO 2005/075353 discloses a natural alkaline earth metal carbonate having a $d_{50}$ of about 0.5 micrometres or less and a moisture pick up of less than about 0.2 wt.-% as well as a process for making the particulate carbonate by grinding. The carbonate may be used in polymer compositions.

WO 2009/094321 discloses monofilament fibres comprising at least one polymeric resin and at least one coated filler, wherein the at least one coated filler has an average particle size of less than or equal to about 3 micrometres and/or has a top cut of less than or equal to about 10 micrometres, and wherein the at least one coated filler is present in an amount of less than or equal to about 50 wt.-%, relative to the total weight of the monofilament fibres. Also disclosed therein are methods for producing monofilament fibres comprising adding ground calcium carbonate to at least one polymeric resin and extruding the resulting mixture.

WO 2011/028934 relates to fibres, such as staple fibres, comprising at least one polymeric resin and at least one coated filler, wherein the at least one coated filler has an average particle size of less than or equal to about 3 micrometres, and wherein the at least one coated filler is present in an amount of less than or equal to about 50 wt.-%, relative to the total weight of the fibres. Also disclosed therein are methods for producing staple fibres, webs, fabrics, and carpets comprising adding at least one filler to at least one polymeric resin and processing the resulting mixture.

WO 2012/052778 discloses tearable polymer films comprising a polyester and a filler, polymer compositions for making said films, methods of production as well as uses thereof.

GB 2 336 366 A relates to filled thermoplastic compositions, and, in particular, filled low density polyethylene compositions which are to be formed into products or articles by the process of extrusion. It is further described that the hydrophobising agent is preferably an organic carboxylic acid or partially or fully neutralised salt thereof which has at least one saturated or unsaturated hydrocarbon chain having from 8 to 28 carbon atoms, if the particulate mineral filler has a neutral to alkaline surface reaction, for example calcium carbonate.

EP 2 159 258 A1 relates to a treated mineral filler product comprising at least one mineral filler, a treatment layer located on the surface of said mineral filler, wherein the treatment layer comprises at least one saturated C8 to C24 aliphatic carboxylic acid, and at least one di- and/or trivalent cation salt of one or more saturated C8 to C24 aliphatic carboxylic acid, wherein the weight ratio of all of said aliphatic carboxylic acid(s): all of said aliphatic acid(s) is from 51:49 to 75:25; and said treatment layer is present in an amount of at least 2.5 mg/m² of said mineral filler.

EP 1 980 588 relates to the domain of mineral filler treatment processes. The process for the preparation of a treated mineral filler product comprises the following steps: (a) treating at least one dry mineral filler with at least one Group II or Group III salt of a C8 to C24 aliphatic monocarboxylic acid to produce an intermediate mineral filler product; followed by (b) treating the intermediate mineral filler product of step (a) with at least one C8 to C24 aliphatic monocarboxylic acid to produce a treated mineral filler product. The treated mineral filler products, such as treated calcium carbonate may be used in plastic applications, such as in polypropylene (PP)- or polyethylene (PE)-based breathable or extrusion coating film applications.

DE 958 830 is directed towards a method for the treatment of natural calcium carbonates with surface-active substances which is characterized in that the calcium carbonate is ground in the presence of natural or synthetic fatty acids, amino-fatty acids, acid amides, fatty alcohols, waxes, and resins. The natural or synthetic surface-active substances may be present in amount of from 0.1 to 40% and grinding may be carried out at temperatures of at least 80° C.

WO 2013/190274 A2 refers to filled biopolymers, especially to compositions comprising a biopolymer and a particulate mineral filler wherein the particulate mineral filler comprises a particulate calcined clay.

WO 03/050167 A1 refers to the use of a ground particulate calcium carbonate material having a $d_{50}$ of less than 1.0 µm as a mineral filler in a stretched thermoplastic polyolefin film, for the purpose of increasing the moisture vapour permeability of said film.

WO 02/55596 A1 concerns a method for treating a mineral filler with a polydialkylsiloxane and a fatty acid, the resulting hydrophobic fillers and uses thereof in polymers for making films, in particular breathable films.

EP 2 390 285 A1 relates to a process for preparing a surface treated mineral filler product, and to its preferred use in the field of plastic applications, and in particular polypropylene (PP)- or polyethylene (PE)-based breathable or extrusion coating film applications.

Unpublished European patent application no. 14 181 082.0 refers to a breathable film comprising at least one thermoplastic polymer and a surface-treated filler material product, wherein the surface-treated filler material product comprises at least one wet ground calcium carbonate-comprising filler material and a treatment layer on the surface of the at least one wet ground calcium carbonate-comprising filler material comprising at least one mono-substituted succinic anhydride and/or at least one mono-substituted succinic acid and/or salty reaction product(s) thereof.

However, the described breathable films have the disadvantage that ultrathin breathable films, i.e. films having a basis weight from 1 to 10 g/m², can be hardly prepared without deteriorating its mechanical properties such as force at break, elongation at break, modulus of elasticity or water column, and the surface quality of the films.

Thus, the provision of ultrathin breathable films, i.e. films having a basis weight from 1 to 10 g/m², having maintained or improved mechanical properties, compared to a film of higher basis weight, and good surface quality remains of interest to the skilled man.

Accordingly, it is an object of the present invention to provide a breathable film having a basis weight from 1 to 10 g/m². It would also be desirable to provide a breathable film having good mechanical properties such as force at break, elongation at break, modulus of elasticity or water column. It would also be desirable to provide a breathable film which retains good breathability and low film defect levels. It would also be desirable to provide a breathable film with good colour properties and good processing characteristics such as low die build-up properties.

Another object of the present invention is the provision of a filler material for breathable films having a basis weight from 1 to 10 g/m². It would also be desirable to provide a filler material for breathable films, which shows good dispersing properties and compounding performance in breathable film applications. It would also be desirable to provide a filler material having a high temperature resistance, and thus, allows higher processing temperatures during the production of breathable films. Furthermore, it would be desirable to provide a filler material which exhibits a low moisture absorption, and therefore, reduces or avoids the problem encountered with associated volatiles, and especially water. It would also be desirable to provide a filler material for breathable films, which imparts good mechanical properties such as force at break, elongation at break, modulus of elasticity or water column and improves the surface quality of the film. It is also an object of the present invention to provide a filler material for breathable films, which allows processing into a masterbatch or a compound, using a continuous process.

The foregoing objects and other objects are solved by the subject-matter as defined herein in the independent claims.

According to one aspect of the present invention, a breathable film having a basis weight from 1 to 10 g/m² is provided. The breathable film comprises at least one thermoplastic polymer and a surface-treated filler material product, wherein the surface-treated filler material product comprises
    A) at least one ground calcium carbonate-comprising filler material having
        a weight median particle size $d_{50}$ in the range from 0.1 µm to 7 µm,
        a top cut particle size $d_{98}$ of ≤15 µm,
        a specific surface area (BET) from 0.5 to 150 m²/g, as measured using nitrogen and the BET method according to ISO 9277, and
        a residual total moisture content of ≤1 wt.-%, based on the total dry weight of the at least one ground calcium carbonate-comprising filler material, and
    B) a treatment layer on the surface of the at least one ground calcium carbonate-comprising filler material comprising
        i. a phosphoric acid ester blend of one or more phosphoric acid mono-ester and salty reaction products thereof and/or one or more phosphoric acid di-ester and salty reaction products thereof, and/or
        ii. at least one saturated aliphatic linear or branched carboxylic acid and salty reaction products thereof, and/or
        iii. at least one aliphatic aldehyde and/or salty reaction products thereof, and/or
        iv. at least one polydialkylsiloxane, and/or
        v. mixtures of the materials according to i. to iv.,
wherein the surface-treated filler material product comprises the treatment layer in an amount of from 0.1 to 3 wt.-%, based on the total dry weight of the at least one ground calcium carbonate-comprising filler material.

According to a further aspect, a process for producing a breathable film having a basis weight from 1 to 10 g/m² is provided comprising the steps of:
    a) providing a composition comprising at least one thermoplastic polymer and a surface-treated filler material product, and
    b) forming a film from the composition of step a), and
    c) stretching the film obtained in step b) into at least one direction, wherein the surface-treated filler material product comprises
    A) at least one ground calcium carbonate-comprising filler material having
        a weight median particle size $d_{50}$ in the range from 0.1 µm to 7 µm,
        a top cut particle size $d_{98}$ of ≤15 µm,
        a specific surface area (BET) from 0.5 to 150 m²/g, as measured using nitrogen and the BET method according to ISO 9277, and
        a residual total moisture content of ≤1 wt.-%, based on the total dry weight of the at least one ground calcium carbonate-comprising filler material, and
    B) a treatment layer on the surface of the at least one ground calcium carbonate-comprising filler material comprising
        i. a phosphoric acid ester blend of one or more phosphoric acid mono-ester and salty reaction products thereof and/or one or more phosphoric acid di-ester and salty reaction products thereof, and/or
        ii. at least one saturated aliphatic linear or branched carboxylic acid and salty reaction products thereof, and/or
        iii. at least one aliphatic aldehyde and/or salty reaction products thereof, and/or
        iv. at least one polydialkylsiloxane, and/or
        v. mixtures of the materials according to i. to iv.,
wherein the surface-treated filler material product comprises the treatment layer in an amount of from 0.1 to 3 wt.-%, based on the total dry weight of the at least one ground calcium carbonate-comprising filler material.

According to still another aspect of the present invention, a use of a surface-treated filler material product as filler in a breathable film having a basis weight from 1 to 10 g/m² is provided, wherein the surface-treated filler material product comprises
    A) at least one ground calcium carbonate-comprising filler material having a weight median particle size $d_{50}$ in the range from 0.1 µm to 7 µm,
a top cut particle size $d_{98}$ of ≤15 µm,
a specific surface area (BET) from 0.5 to 150 m²/g, as measured using nitrogen and the BET method according to ISO 9277, and
a residual total moisture content of ≤1 wt.-%, based on the total dry weight of the at least one ground calcium carbonate-comprising filler material, and B) a treatment layer on the surface of the at least one ground calcium carbonate-comprising filler material comprising
  i. a phosphoric acid ester blend of one or more phosphoric acid mono-ester and salty reaction products thereof and/or one or more phosphoric acid di-ester and salty reaction products thereof, and/or
  ii. at least one saturated aliphatic linear or branched carboxylic acid and salty reaction products thereof, and/or
  iii. at least one aliphatic aldehyde and/or salty reaction products thereof, and/or
  iv. at least one polydialkylsiloxane, and/or
  v. mixtures of the materials according to i. to iv.,
wherein the surface-treated filler material product comprises the treatment layer in an amount of from 0.1 to 3 wt.-%, based on the total dry weight of the at least one ground calcium carbonate-comprising filler material.

According to still another aspect of the present invention, an article comprising a breathable film having a basis weight from 1 to 10 g/m² as defined herein is provided, wherein the article is selected from the group consisting of hygiene products, medical products, healthcare products, filter products, geotextile products, agriculture products, horticulture products, clothing, footwear products, baggage products, household products, industrial products, packaging products, building products, and construction products.

According to still another aspect of the present invention, a use of a breathable film having a basis weight from 1 to 10 g/m² as defined herein in hygienic applications, medical applications, healthcare applications, filtration materials, geotextile products, agricultural applications, horticultural applications, clothing, footwear products, baggage products, household applications, industrial applications, packaging applications, building applications, or construction is provided.

Advantageous embodiments of the present invention are defined herein and also in the corresponding sub-claims.

According to one embodiment of the present invention, the at least one ground calcium carbonate-comprising filler material is a wet ground calcium carbonate-comprising filler material. Accordingly, it is specifically contemplated or preferred to use wet ground calcium-carbonate-comprising filler materials in relation to the foregoing aspects of the present invention.

According to another embodiment the at least one thermoplastic polymer is a polyolefin, preferably selected from the group consisting of polypropylene, polyethylene, polybutylene, and mixtures thereof, and more preferably selected from the group consisting of high density polyethylene (HDPE), linear low density polyethylene (LLDPE), low density polyethylene (LDPE), ultra-low density polyethylene (ULDPE), very low density polyethylene (VLDPE), and mixtures thereof.

According to yet another embodiment the breathable film comprises the surface-treated filler material product in an amount from 1 to 85 wt.-%, based on the total weight of the breathable film, preferably from 2 to 80 wt.-%, more preferably from 5 to 75 wt.-%, even more preferably from 10 to 65 wt.-%, and most preferably from 15 wt.-% to 60 wt.-%.

According to another embodiment the at least one ground (especially wet ground) calcium carbonate-comprising filler material is natural ground calcium carbonate (GCC), precipitated calcium carbonate, modified calcium carbonate, surface-treated calcium carbonate, or a mixture thereof, and preferably natural ground calcium carbonate (GCC).

According to one embodiment the at least one ground (especially wet ground) calcium carbonate-comprising filler material has a) a weight median particle size $d_{50}$ from 0.25 µm to 5 µm, preferably from 0.5 µm to 4 µm, and most preferably from 0.6 µm to 1 µm, and/or b) a top cut particle size $d_{98}$ of ≤12.5 µm, preferably of ≤10 µm, more preferably of ≤7.5 µm and most preferably of ≤3 µm, and/or c) a fineness such that at least 65 wt.-%, preferably at least 70 wt.-%, even more preferably at least 75 wt.-% and most preferably at least 80 wt.-% of all particles have a particle size of <1 µm.

According to another embodiment the at least one ground (especially wet ground) calcium carbonate-comprising filler material has a specific surface area (BET) of from 0.5 to 50 m²/g, more preferably of from 0.5 to 35 m²/g, and most preferably of from 0.5 to 15 m²/g, as measured using nitrogen and the BET method according to ISO 9277.

According to yet another embodiment the at least one ground (especially wet ground) calcium carbonate-comprising filler material has a residual total moisture content of from 0.01 to 0.2 wt.-%, preferably from 0.02 to 0.15 wt.-%, and most preferably from 0.04 to 0.15 wt.-%, based on the total dry weight of the at least one ground (especially wet ground) calcium carbonate-comprising filler material.

According to one embodiment of the present invention, the treatment layer on the surface of the at least one ground calcium carbonate-comprising filler material comprises at least one saturated aliphatic linear or branched carboxylic acid and salty reaction products thereof, preferably the at least one saturated aliphatic linear or branched carboxylic acid is selected from the group consisting of carboxylic acids consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid and mixtures thereof.

According to another embodiment the surface-treated filler material product has a moisture pick-up from 0.1 to 1 mg/g, preferably from 0.2 to 0.9 mg/g, and most preferably from 0.2 to 0.8 mg/g, at a temperature of 23° C. (±2° C.).

According to yet another embodiment the surface-treated filler material product has a volatile onset temperature≥250° C., preferably ≥260° C., and most preferably ≥270° C.

According to one embodiment, the film has a basis weight from 5 to 10 g/m², preferably from 6 to 10 g/m², more preferably from 7 to 9 g/m² and most preferably about 8 g/m².

According to another embodiment the composition provided in step a) of the inventive process is a masterbatch or a compound obtained by mixing or compounding said components. The at least one thermoplastic polymer and the surface-treated filler material product, and, if present, other optional additives, may be mixed by the use of a suitable mixer, e.g. a Henschel mixer, a super mixer, a tumbler type mixer or the like.

The compounding step may be done with a suitable extruder, preferably by a twin screw extruder (co- or counter-rotating) or by any other suitable continuous compounding equipment, e.g. a continuous co-kneader (Buss), a continuous mixer (Farrel Pomini), a ring extruder (Extricom) or the like. The continuous polymer mass from extrusion may be either pelletized by (hot cut) die face pelletizing with underwater pelletizing, eccentric pelletizing and watering pelletizing or by (cold cut) strand pelletizing with underwater and conventional strand pelletizing to form the extruded polymer mass into pellets.

Optionally, the compounding step may also be performed with a discontinuous or batch process using an internal (batch) mixer, e.g. a Banburry mixer (HF Mixing Group) or a Brabender mixer (Brabender) or the like.

It should be understood that for the purposes of the present invention, the following terms have the following meanings:

The term "ground calcium carbonate-comprising filler" in the gist of the present invention means a calcium carbonate-comprising filler which has been manufactured by a process including at least one grinding step. "Ground calcium carbonate-comprising fillers may be "wet ground" or "dry ground", wherein a "wet ground calcium carbonate-comprising filler" in the meaning of the present invention is a ground calcium carbonate comprising filler which has been manufactured by a process including at least one grinding step in aqueous suspension with a solids content between 20 and 80 wt.-% and a "dry ground calcium carbonate-comprising filler" is a ground calcium carbonate comprising filler which has been manufactured by a process including at least one grinding step in aqueous suspension with a solids content of more than 80 and up to 100 wt.-%.

The term "breathable film" in the meaning of the present invention refers to a polymer film that allows the passage of gases and moisture vapour, for example, due to the presence of micropores. The "breathability" of a breathable film can be measured by its water vapour transmission rate (WVTR), which is specified in $g/(m^2 \cdot day)$. For example, a polymer film may considered as being "breathable" if it has a WVTR of at least 1 000 $g/(m^2 \cdot day)$. The WVTR may be determined with a Lyssy L80-5000 measuring device according to ASTM E398.

The term "ultrathin" breathable film in the meaning of the present invention refers to a polymer film having a basis weight from 1 to 10 $g/m^2$, preferably from 5 to 10 $g/m^2$, more preferably from 6 to 10 $g/m^2$, even more preferably from 7 to 9 $g/m^2$ and most preferably about 8 $g/m^2$.

A "film" in the meaning of the present invention is a sheet or layer of material having a median thickness which is small compared to its length and width. For example, the term "film" may refer to a sheet or layer of material having a median thickness of less than 200 µm, but more than 1 µm.

As used herein, "hydrohead" is a measure of the breathable film's resistance to liquid penetration, this means its barrier properties. The barrier properties of a breathable film were measured by using the hydrostatic pressure test which measures the resistance of the film sample to the penetration of water under low hydrostatic pressure. The procedure used is equivalent to AATCC Test Method 127-2013, WSP 80.6 and ISO 811. A film sample (test area=10 $cm^2$) is mounted to form a cover on the test head reservoir. This film sample is subjected to a standardized water pressure, increased at a constant rate until leakage appears on the outer surface of the film, or water burst occurs as a result of film failure (pressure rate gradient=100 mbar/min). Water pressure is measured as the hydrostatic head height reached at the first sign of leakage in three separate areas of the film sample or when burst occurs. The head height results are recorded in centimetres or millibars of water pressure on the specimen. A higher value indicates greater resistance to water penetration. The TEXTEST FX-3000, Hydrostatic Head Tester (Textest AG, Switzerland), was used for the hydrostatic pressure measurements.

For the purpose of the present invention, the term "calcium carbonate-comprising filler material" refers to a material that comprises at least 80 wt.-% calcium carbonate, based on the total dry weight of the calcium carbonate-comprising filler material.

"Natural ground calcium carbonate" (GCC) in the meaning of the present invention is a calcium carbonate obtained from natural sources, such as limestone, marble, dolomite or chalk, and processed through a wet treatment such as grinding, screening and/or fractionation, for example by a cyclone or classifier.

"Modified calcium carbonate" (MCC) in the meaning of the present invention may feature a natural ground or precipitated calcium carbonate with an internal structure modification or a surface-reaction product, i.e. "surface-reacted calcium carbonate". A "surface-reacted calcium carbonate" is a material comprising calcium carbonate and insoluble, preferably at least partially crystalline, calcium salts of anions of acids on the surface. Preferably, the insoluble calcium salt extends from the surface of at least a part of the calcium carbonate. The calcium ions forming said at least partially crystalline calcium salt of said anion originate largely from the starting calcium carbonate material. MCCs are described, for example, in US 2012/0031576 A1, WO 2009/074492 A1, EP 2 264 109 A1, EP 2 070 991 A1, or EP 2 264 108 A1.

The term "surface-treated filler material product" in the meaning of the present invention refers to a calcium carbonate-comprising filler material which has been contacted with a surface treatment agent such as to obtain a coating layer on at least a part of the surface of the calcium carbonate-comprising filler material.

The term "dry" calcium carbonate-comprising filler material is understood to be a filler material having less than 0.3% by weight of water relative to the filler material weight. The % water (equal to "residual total moisture content") is determined according to the Coulometric Karl Fischer measurement method, wherein the filler material is heated to 220° C., and the water content released as vapour and isolated using a stream of nitrogen gas (at 100 ml/min) is determined in a Coulometric Karl Fischer unit.

The term "moisture pick-up susceptibility" in the meaning of the present invention refers to the amount of moisture adsorbed on the surface of the mineral filler and can determined in mg moisture/g of the dry treated mineral filler product after exposure to an atmosphere of 10 and 85% of relative humidity, resp., for 2.5 hours at a temperature of +23° C. (±2° C.).

The term "polymer composition" refers to a composite material comprising at least one additive (e.g., at least one filler) and at least one polymer material which may be used in the production of a polymer product.

The term "polymer masterbach" (=or "masterbatch") relates to a composition with a relative high filler content, preferably at least or equal to 60 wt.-% (based on the total weight of the composition). A "polymer masterbatch" may be added to an unfilled or lowly filled polymer during processing in order to achieve higher filler contents. Nevertheless, a "polymer composition" (=or "composition") as defined earlier having a relative low filler content, preferably below 60 wt.-% (based on the total weight of the composition), and which often also referred to as a "polymer compound" (=or "compound"), may also be used directly in the production of a polymer product.

Accordingly, the term "polymer composition" (=composition) as used herein comprises both, "polymer masterbatches" and "polymer compounds".

For the purpose of the present application, the "volatile onset temperature" is defined as the temperature at which volatiles—including volatiles introduced as a result of common mineral filler preparation steps including grinding, with or without grinding aid agents, beneficiation, with or without flotation aid or other agents, and other pre-treatment agents not expressly listed above, detected according to the thermogravimetric analysis described hereafter—begin to evolve, as observed on a thermogravimetric (TGA) curve, plotting the mass of remaining sample (y-axis) as a function of temperature (x-axis), the preparation and interpretation of such a curve being defined hereafter.

TGA analytical methods provide information regarding losses of mass and volatile onset temperatures with great accuracy, and is common knowledge; it is, for example, described in "Principles of Instrumental analysis", fifth edition, Skoog, Holler, Nieman, 1998 (first edition 1992) in Chapter 31 pages 798 to 800, and in many other commonly known reference works. In the present invention, thermogravimetric analysis (TGA) is performed using a Mettler Toledo TGA 851 based on a sample of 500+/−50 mg and scanning temperatures from 25 to 280° C. or 25 to 400° C. at a rate of 20° C./minute under an air flow of 70 ml/min. The skilled man will be able to determine the "volatile onset temperature" by analysis of the TGA curve as follows: the first derivative of the TGA curve is obtained and the inflection points thereon between 150 and 280° C. or 25 to 400° C. are identified. Of the inflection points having a tangential slope value of greater than 45° relative to a horizontal line, the one having the lowest associated temperature above 200° C. is identified. The temperature value associated with this lowest temperature inflection point of the first derivative curve is the "volatile onset temperature". The total weight of the surface treatment agent on the accessible surface area of the filler can be determined by thermogravimetric analysis by mass loss between 105° C. to 400° C.

For the purpose of the present application, the "total volatiles" associated with mineral fillers and evolved over a temperature range of 25 to 280° C. or 25 to 400° C. is characterised according to % mass loss of the mineral filler sample over a temperature range as read on a thermogravimetric (TGA) curve. The "total volatiles" evolved on the TGA curve is determined using Star® SW 9.01 software. Using this software, the curve is first normalised relative to the original sample weight in order to obtain mass losses in % values relative to the original sample. Thereafter, the temperature range of 25 to 280° C. or 25 to 400° C. is selected and the step horizontal (in German: "Stufe horizontal") option selected in order to obtain the % mass loss over the selected temperature range.

The term "specific surface area" (in $m^2/g$) of the mineral filler in the meaning of the present invention is determined using the BET method with nitrogen as adsorbing gas, which is well known to the skilled man (ISO 9277:1995). The total surface area (in $m^2$) of the mineral filler is then obtained by multiplying the specific surface area by the mass (in g) of the mineral filler prior to treatment.

Throughout the present document, the "particle size" of a calcium carbonate-comprising filler is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{98}$ value is the particle size at which 98 wt.-% of all particles are smaller. The $d_{98}$ value is also designated as "top cut". The $d_{50}$ value is thus the weight median particle size, i.e. 50 wt.-% of all grains are smaller than this particle size. For the purpose of the present invention the particle size is specified as weight median particle size $d_{50}$ unless indicated otherwise. For determining the weight median particle size $d_{50}$ value or the top cut particle size $d_{98}$ value a Sedigraph 5100 or 5120 device from the company Micromeritics, USA, can be used. The method and the instrument are known to the skilled person and are commonly used to determine grain size of fillers and pigments. The measurement is carried out in an aqueous solution of 0.1 wt.-% $Na_4P_2O_7$. The samples are dispersed using a high speed stirrer and supersonics.

For the purpose of the present invention, the "solids content" of a liquid composition is a measure of the amount of material remaining after all the solvent or water has been evaporated.

A "suspension" or "slurry" in the meaning of the present invention comprises insoluble solids and water, and optionally further additives, and usually contains large amounts of solids and, thus, is more viscous and can be of higher density than the liquid from which it is formed.

A "treatment layer" in the gist of the present invention refers to a layer, preferably a monolayer of a surface treatment agent on the surface of the at least one ground calcium carbonate-comprising filler material. The "treatment layer" comprises as surface treatment agent i. a phosphoric acid ester blend of one or more phosphoric acid mono-ester and salty reaction products thereof and/or one or more phosphoric acid di-ester and salty reaction products thereof, and/or ii. at least one saturated aliphatic linear or branched carboxylic acid and salty reaction products thereof, and/or iii. at least one aliphatic aldehyde and/or salty reaction products thereof, and/or iv. at least one polydialkylsiloxane, and/or v. mixtures of the materials according to i. to iv.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

The inventive breathable film has a basis weight from 1 to 10 $g/m^2$ and comprises at least one thermoplastic polymer and a surface-treated filler material product. The surface-treated filler material product comprises (A) at least one ground (especially wet ground) calcium carbonate-comprising filler material having a weight median particle size $d_{50}$ in the range from 0.1 µm to 7 µm, a top cut particle size $d_{98}$ of ≤15 µm, a specific surface area (BET) from 0.5 to 150 m²/g, as measured using nitrogen and the BET method according to ISO 9277, and a residual total moisture content of ≤1 wt.-%, based on the total dry weight of the at least one ground (especially wet ground) calcium carbonate-comprising filler material, and (B) a treatment layer on the surface of the at least one ground (especially wet ground) calcium carbonate-comprising filler material comprising i. a phosphoric acid ester blend of one or more phosphoric acid mono-ester and salty reaction products thereof and/or one or more phosphoric acid di-ester and salty reaction products thereof, and/or ii. at least one saturated aliphatic linear or branched carboxylic acid and salty reaction products thereof, and/or iii. at least one aliphatic aldehyde and/or salty reaction products thereof, and/or iv at least one polydialkylsiloxane, and/or v. mixtures of the materials according to i. to iv. The surface-treated filler material product comprises the treatment layer in an amount of from 0.1 to 3 wt.-%, based on the total dry weight of the at least one ground (especially wet ground) calcium carbonate-comprising filler material.

In the following details and preferred embodiments of the inventive product will be set out in more detail. It is to be understood that these technical details and embodiments also apply to the inventive process for producing said breathable film and the inventive use of the breathable film and the surface-treated filler material product.

Thermoplastic Polymer

The breathable film having a basis weight from 1 to 10 g/m² of the present invention comprises at least one thermoplastic polymer. It is appreciated that the at least one thermoplastic polymer is not restricted to a specific material as long as the polymer is suitable for the preparation of a breathable film. The skilled person will select the thermoplastic polymer in accordance with the desired properties of the breathable film such as temperature resistance or elastic recovery.

It is appreciated that the expression "at least one" thermoplastic polymer means that the thermoplastic polymer comprises, preferably consists of, one or more kinds of thermoplastic polymer(s).

Accordingly, it should be noted that the at least one thermoplastic polymer may be one kind of thermoplastic polymer. Alternatively, the at least one thermoplastic polymer may be a mixture of two or more kinds of thermoplastic polymers. For example, the at least one thermoplastic polymer may be a mixture of two or three kinds of thermoplastic polymers, like two kinds of thermoplastic polymers.

In one embodiment of the present invention, the at least one thermoplastic polymer comprises, preferably consists of, two kinds of thermoplastic polymers.

Alternatively, the at least one thermoplastic polymer comprises, preferably consists of, one kind of thermoplastic polymer.

According to one embodiment, the at least one thermoplastic polymer is a polyolefin. Polyolefin polymers that may be used are preferably selected from the group consisting of polypropylene, polyethylene, polybutylene, and mixtures thereof.

According to one embodiment, the at least one thermoplastic polymer is a polyethylene, preferably selected from the group consisting of high density polyethylene (HDPE), linear low density polyethylene (LLDPE), low density polyethylene (LDPE), ultra-low density polyethylene (ULDPE), very low density polyethylene (VLDPE), and mixtures thereof.

A polyethylene having a density ranging from 0.936 g/cm³ to about 0.965 g/cm³ is typically called "high density polyethylenes (HDPE)".

A polyethylene having a density ranging from 0.910 g/cm³ to about 0.940 g/cm³ is typically called "low density polyethylenes (LDPE)".

The term "linear low density polyethylene (LLDPE)" refers to a substantially linear polymer (polyethylene), with significant numbers of short branches, commonly made by copolymerization of ethylene with longer-chain olefins. Linear low-density polyethylene differs structurally from low-density polyethylene (LDPE) in the absence of long chain branching. The linearity of LLDPE results from the different manufacturing processes of LLDPE. In general, LLDPE is produced at lower temperatures and pressures by copolymerization of ethylene and higher alpha-olefins such as 1-butene, 1-hexene, or 1-octene. LLDPE has typically a density in the range from 0.911 g/cm³ to 0.940 g/cm³, and preferably in the range from 0.912 g/cm³ to 0.928 g/cm³ for breathable film applications.

"Very low density linear low density polyethylenes (VLDPE) is a substantially linear polymer with high levels of short-chain branches, commonly made by copolymerization of ethylene with short-chain alpha-olefins such as 1-butene, 1-hexene or 1-octene. VLDPE has typically a density in the range from 0.900 to 0.914 g/cm³.

"Ultra-low density linear low density polyethylenes (ULDPE) is a substantially linear polymer with high levels of short-chain branches, commonly made by copolymerization of ethylene with short-chain alpha-olefins such as 1-butene, 1-hexene or 1-octene. ULDPE has typically a density in the range from 0.860 to 0.899 g/cm³.

According to one embodiment, the thermoplastic polymer comprises a linear low density polyethylene (LLDPE), preferably a LLDPE having a density in the range from 0.912 g/cm³ to 0.928 g/cm³. The inventors found that LLDPE polymers having a density in said range may show very good barrier and processability properties, especially in combination with the surface-treated filler material product according to the present invention. If the thermoplastic polymer comprises a linear low density polyethylene (LLDPE), the at least one thermoplastic polymer comprises 80 to 98 wt.-% LLDPE, more preferably 86 to 94 wt.-% LLDPE, and most preferably about 90 wt.-% LLDPE, based on the total amount of thermoplastic polymer.

According to one embodiment, the at least one thermoplastic polymer comprises 2 to 20 wt.-% LDPE, more preferably 6 to 14 wt.-% LDPE, and most preferably about 10 wt.-% LDPE, based on the total amount of thermoplastic polymer.

For example, the at least one thermoplastic polymer comprises, preferably consists of, 80 to 98 wt.-% LLDPE, more preferably 86 to 94 wt.-% LLDPE, and most preferably about 90 wt.-% LLDPE, based on the total amount of thermoplastic polymer and 2 to 20 wt.-% LDPE, more preferably 6 to 14 wt.-% LDPE, and most preferably about 10 wt.-% LDPE, based on the total amount of thermoplastic polymer. It is appreciated that the sum of the amounts of the LLDPE and of the LDPE is preferably 100 wt.-%, based on the total amount of thermoplastic polymer.

In an alternative embodiment, the at least one thermoplastic polymer comprises, preferably consists of, a LLDPE and LDPE in a specific weight ratio. For example, the at least one thermoplastic polymer comprises, preferably consists of, a LLDPE and LDPE in a weight ratio [LLDPE:LDPE] from 40:10 to 45:5, and most preferably of about 45:5, wherein the density of the LLDPE is from 0.912 g/cm$^3$ to 0.928 g/cm$^3$ and the density of the LDPE is from 0.910 g/cm$^3$ to about 0.940 g/cm$^3$.

According to another embodiment, the thermoplastic polymer comprises a polypropylene (PP), preferably a PP having a density in the range from 0.890 g/cm$^3$ to 0.910 g/cm$^3$. If the thermoplastic polymer comprises a polypropylene (PP), the at least one thermoplastic polymer comprises 10 to 30 wt.-% PP, more preferably 15 to 25 wt.-% PP, and most preferably about 20 wt.-% PP, based on the total amount of thermoplastic polymer.

Additionally or alternatively, the thermoplastic polymer comprises a polyethylene (PE), preferably a PE having a density in the range from 0.912 g/cm$^3$ to 0.928 g/cm$^3$. For example, the PE is a bimodal linear low density polyethylene (LLDPE). If the thermoplastic polymer comprises a polyethylene (PE), the at least one thermoplastic polymer comprises 70 to 90 wt.-% PE, more preferably 75 to 85 wt.-% PE, and most preferably about 80 wt.-% PE, based on the total amount of thermoplastic polymer.

For example, the at least one thermoplastic polymer comprises, preferably consists of, 10 to 30 wt.-% PP, more preferably 15 to 25 wt.-% PP, and most preferably about 20 wt.-% PP, based on the total amount of thermoplastic polymer, and 70 to 90 wt.-% PE, more preferably 75 to 85 wt.-% PE, and most preferably about 80 wt.-% PE, based on the total amount of thermoplastic polymer. It is appreciated that the sum of the amounts of the PP and of the PE is preferably 100 wt.-%, based on the total amount of thermoplastic polymer.

Alternatively, the at least one thermoplastic polymer comprises, preferably consists of, a polypropylene (PP) having a density in the range from 0.890 g/cm$^3$ to 0.910 g/cm$^3$.

In another embodiment the at least one thermoplastic polymer comprises, preferably consists of, a polyethylene (PE) and polypropylene (PP) in a specific weight ratio. For example, the at least one thermoplastic polymer comprises, preferably consists of, a polyethylene (PE) and polypropylene (PP) in a weight ratio [PE:PP] from 40:10 to 45:5, and most preferably of about 40:10, wherein the density of the polyethylene (PE) is from 0.912 g/cm$^3$ to 0.928 g/cm$^3$ and the density of the polypropylene (PP) is from 0.890 g/cm$^3$ to 0.910 g/cm$^3$.

According to one embodiment of the present invention, the melt flow rate (MFR) determined according to ISO 1133 (190° C., 2.16 kg) of the at least one thermoplastic polymer is preferably from 0.01 to 20, and more preferably from 0.1 to 10 g/10 min.

The breathable film can comprise the at least one thermoplastic polymer in an amount of at least 15 wt.-%, based on the total weight of the breathable film, preferably of at least 20 wt.-%, more preferably of at least 30 wt.-%, and most preferably at least 40 wt.-%, for example, about 50 wt.-%. According to one embodiment, the breathable film comprises the at least one thermoplastic polymer in an amount from 15 to 70 wt.-%, preferably from 20 to 70 wt.-%, more preferably from 30 to 65 wt.-%, and most preferably from 40 to 60 wt.-%, based on the total weight of the breathable film.

Surface-Treated Filler Material Product

The breathable film of the present invention also comprises a surface-treated filler material product, wherein the surface-treated filler material product comprises at least one ground (especially wet ground) calcium carbonate-comprising filler material having several essential features, which are defined in claim 1 and will be described in more detail in the following.

The at least one ground calcium carbonate-comprising filler material in the meaning of the present invention refers to a filler material selected from among natural ground calcium carbonate (GCC), precipitated calcium carbonate (PCC), modified calcium carbonate (MCC), surface-treated calcium carbonate, or mixtures thereof. According to a preferred embodiment, the at least one ground calcium carbonate-comprising filler material is a natural ground calcium carbonate (GCC), more preferably the ground calcium carbonate-carbonate comprising filler is a wet ground natural ground calcium carbonate.

GCC is understood to be a naturally occurring form of calcium carbonate, mined from sedimentary rocks such as limestone or chalk, or from metamorphic marble rocks and processed through a treatment such as grinding, screening and/or fractionizing in wet form, for example by a cyclone or classifier. In one embodiment of the present invention, the GCC is selected from the group comprising marble, chalk, dolomite, limestone and mixtures thereof.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water or by precipitation of calcium and carbonate ions, for example $CaCl_2$ and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried.

A modified calcium carbonate may feature a GCC or PCC with an internal structure modification or a surface-reacted GCC or PCC. A surface-reacted calcium carbonate may be prepared by providing a GCC or PCC in form of an aqueous suspension, and adding an acid to said suspension. Suitable acids are, for example, sulphuric acid, hydrochloric acid, phosphoric acid, citric acid, oxalic acid, or a mixture thereof. In a next step, the calcium carbonate is treated with gaseous carbon dioxide. If a strong acid such as sulphuric acid or hydrochloric acid is used for the acid treatment step, the carbon dioxide will form automatically in situ. Alternatively or additionally, the carbon dioxide can be supplied from an external source. Surface-reacted calcium carbonates are described, for example, in US 2012/0031576 A1, WO 2009/074492 A1, EP 2 264 109 A1, EP 2 070 991 A1, or EP 2 264 108 A1.

In one preferred embodiment, the at least one ground calcium carbonate-comprising filler material is marble, more preferably a wet ground marble.

It is appreciated that the amount of ground (especially wet ground) calcium carbonate in the at least one calcium carbonate-comprising filler material is at least 80 wt.-%, e.g.

at least 95 wt.-%, preferably between 97 and 100 wt.-%, more preferably between 98.5 and 99.95 wt.-%, based on the total dry weight of the at least one ground calcium carbonate-comprising filler material.

The at least one ground (especially wet ground) calcium carbonate-comprising filler material is preferably in the form of a particulate material, and may have a particle size distribution as conventionally employed for the material(s) involved in the type of product to be produced. In general, it is one specific requirement of the present invention that the at least one ground (especially wet ground) calcium carbonate-comprising filler material has a weight median particle size $d_{50}$ value in the range from 0.1 to 7 μm. For example, the at least one ground (especially wet ground) calcium carbonate-comprising filler material has a weight median particle size $d_{50}$ from 0.25 μm to 5 μm, preferably from 0.5 μm to 4 μm and most preferably from 0.6 μm to 1 μm.

A further requirement of the present invention is that the at least one ground (especially wet ground) calcium carbonate-comprising filler material has a top cut ($d_{98}$) of ≤15 μm. For example, the at least one ground (especially wet ground) calcium carbonate-comprising filler material has a top cut ($d_{98}$) of ≤12.5 μm, preferably of ≤10 μm, more preferably of ≤7.5 μm and most preferably of ≤3 μm.

It is appreciated that the weight median particle size $d_{50}$ value and the top cut ($d_{98}$) of the at least one ground (especially wet ground) calcium carbonate-comprising filler material fulfil a specific ratio. For example, the at least one ground (especially wet ground) calcium carbonate-comprising filler material has a ratio of weight median particle size $d_{50}$ value and the top cut ($d_{98}$) [$d_{50}/d_{98}$] of from 0.1 to 0.4, preferably from 0.1 to 0.3 and most preferably from 0.15 to 0.25.

Additionally or alternatively, the at least one ground (especially wet ground) calcium carbonate-comprising filler material has a fineness such that at least 65 wt.-%, preferably at least 70 wt.-%, even more preferably at least 75 wt.-% and most preferably at least 80 wt.-% of all particles have a particle size of <1 μm.

In one embodiment, the at least one ground (especially wet ground) calcium carbonate-comprising filler material has a fineness such that at least 10 wt.-%, preferably from 10 to 70 wt.-%, even more preferably from 10 to 60 wt.-% and most preferably from 10 to 50 wt.-% of all particles have a particle size of <0.5 μm. For example, from 10 to 15 wt.-% of all particles have a particle size of <0.5 μm. Alternatively, from 30 to 45 wt.-% of all particles have a particle size of <0.5 μm.

It is specifically advantageous if the at least one ground (especially wet ground) calcium carbonate-comprising filler material comprises a high amount of fine particles. Preferably, the at least one ground (especially wet ground) calcium carbonate-comprising filler material has a fineness such that at least 80 wt.-% of all particles have a particle size of <1 μm and from 30 to 45 wt.-% of all particles have a particle size of <0.5 μm.

In one embodiment, the at least one ground (especially wet ground) calcium carbonate-comprising filler material has
  i) a weight median particle size $d_{50}$ from 0.25 μm to 5 μm, preferably from 0.5 μm to 4 μm and most preferably from 0.6 μm to 1 μm, and
  ii) a top cut ($d_{98}$) of ≤12.5 μm, preferably of ≤10 μm, more preferably of ≤7.5 μm and most preferably of ≤3 μm, and
  iii) a fineness such that at least 65 wt.-%, preferably at least 70 wt.-%, even more preferably at least 75 wt.-% and most preferably at least 80 wt.-% of all particles have a particle size of <1 μm.

For example, the at least one ground (especially wet ground) calcium carbonate-comprising filler material has
  i) a weight median particle size $d_{50}$ from 0.6 μm to 1 μm, and
  ii) a top cut ($d_{98}$) of ≤3 μm, and
  iii) a fineness such that at least 80 wt.-% of all particles have a particle size of <1 μm.

It is further appreciated that the at least one ground (especially wet ground) calcium carbonate-comprising filler material has a BET specific surface area of from 0.5 and 150 m²/g, as measured using nitrogen and the BET method according to ISO 9277. For example, the at least one ground (especially wet ground) calcium carbonate-comprising filler material has a specific surface area (BET) of from 0.5 to 50 m²/g, more preferably of from 0.5 to 35 m²/g and most preferably of from 0.5 to 15 m²/g, as measured using nitrogen and the BET method according to ISO 9277.

In one embodiment of the present invention, the at least one ground (especially wet ground) calcium carbonate-comprising filler material is preferably a marble having a median particle size diameter $d_{50}$ value from 0.1 μm to 7 μm, preferably from 0.25 μm to 5 μm, more preferably from 0.5 μm to 4 μm and most preferably from 0.6 μm to 1 μm. In this case, the at least one ground (especially wet ground) calcium carbonate-comprising filler material exhibits a BET specific surface area of from 0.5 to 150 m²/g, preferably of from 0.5 to 50 m²/g, more preferably of from 0.5 to 35 m²/g and most preferably of from 0.5 to 15 m²/g, measured using nitrogen and the BET method according to ISO 9277.

In a preferred embodiment the ground calcium carbonate-comprising filler is a wet ground calcium carbonate-comprising filler. However, dry ground calcium carbonate-comprising fillers may also be used.

The wet grinding step may be performed under conditions such that autogenous grinding takes place and/or by horizontal ball milling, and/or other such processes known to the skilled man. The processed ground calcium carbonate-comprising filler material thus obtained may be washed and dewatered by well-known processes, e.g. by flocculation, filtration or forced evaporation prior to drying. The subsequent step of drying may be carried out in a single step such as spray drying, or in at least two steps, e.g. by applying a first heating step to the wet ground calcium carbonate-comprising filler material in order to reduce the associated moisture content to a level which is not greater than about 0.5 wt.-%, based on the total dry weight of the at least one wet ground calcium carbonate-comprising filler material. The residual total moisture content of the filler can be measured by the Karl Fischer Coulometric titration method, desorbing the moisture in an oven at 195° C. and passing it continuously into the KF Coulometer (Mettler Toledo Coulometric KF Titrator C30, combined with Mettler oven DO 0337) using dry $N_2$ at 100 ml/min for 10 min. The residual total moisture content can be determined with a calibration curve and also a blind of 10 min gas flow without a sample can be taken into account. The residual total moisture content may be further reduced by applying a second heating step to the at least one wet ground calcium carbonate-comprising filler material. In case said drying is carried out by more than one drying steps, the first step may be carried out by heating in a hot current of air, while the second and further drying steps are preferably carried out by an indirect heating in which the atmosphere in the corresponding vessel comprises a surface treatment agent. It is also common that the at least one wet ground calcium carbonate-comprising filler material is subjected to a beneficiation step (such as a flotation, bleaching or magnetic separation step) to remove impurities.

In another preferred embodiment, the at least one ground (especially wet ground) calcium carbonate-comprising filler material is a material being ground in a horizontal ball mill, and subsequently dried by using the well-known process of spray drying.

According to the present invention the at least one ground calcium carbonate-comprising filler material has a residual moisture content of ≤1 wt.-%, based on the total dry weight of the at least one ground calcium carbonate-comprising filler material. Depending on the at least one ground calcium carbonate-comprising filler material, the at least one ground calcium carbonate-comprising filler material has a residual total moisture content of from 0.01 to 1 wt.-%, preferably from 0.01 to 0.2 wt.-%, more preferably from 0.02 to 0.15 wt.-% and most preferably from 0.04 to 0.15 wt.-%, based on the total dry weight of the at least one ground calcium carbonate-comprising filler material.

For example, in case a ground (especially wet ground) and spray dried marble is used as the at least one ground calcium carbonate-comprising filler material, the residual total moisture content of the at least one ground calcium carbonate-comprising filler material is preferably of from 0.01 to 0.1 wt.-%, more preferably from 0.02 to 0.08 wt.-% and most preferably from 0.04 to 0.07 wt.-% based on the total dry weight of the at least one ground calcium carbonate-comprising filler material. If a PCC is used as the at least one ground calcium carbonate-comprising filler material, the residual total moisture content of the at least one ground calcium carbonate-comprising filler material is preferably of from 0.01 to 0.2 wt.-%, more preferably from 0.05 to 0.17 wt.-% and most preferably from 0.05 to 0.10 wt.-%, based on the total dry weight of the at least one ground calcium carbonate-comprising filler material.

According to the present invention the surface-treated filler material product further comprises a treatment layer on the surface of the at least one ground (especially wet ground) calcium carbonate-comprising filler material.

The treatment layer comprises
i) a phosphoric acid ester blend of one or more phosphoric acid mono-ester and salty reaction products thereof and/or one or more phosphoric acid di-ester and salty reaction products thereof, and/or
ii) at least one saturated aliphatic linear or branched carboxylic acid and salty reaction products thereof, and/or
iii) at least one aliphatic aldehyde and/or salty reaction products thereof, and/or
iv) at least one polydialkylsiloxane, and/or
v) mixtures of the materials according to i) to iv).

According to one embodiment of the present invention, the surface-treated filler material product comprises a treatment layer on at least a part of the surface of the at least one ground (especially wet ground) calcium carbonate-comprising filler material, wherein the treatment layer comprises a phosphoric acid ester blend of one or more phosphoric acid mono-ester and salty reaction products thereof and/or one or more phosphoric acid di-ester and salty reaction products thereof.

The term "phosphoric acid mono-ester" in the meaning of the present invention refers to an o-phosphoric acid molecule mono-esterified with one alcohol molecule selected from unsaturated or saturated, branched or linear, aliphatic or aromatic alcohols having a total amount of carbon atoms from C6 to C30, preferably from C8 to C22, more preferably from C8 to C20, and most preferably from C8 to C18 in the alcohol substituent.

The term "phosphoric acid di-ester" in the meaning of the present invention refers to an o-phosphoric acid molecule di-esterified with two alcohol molecules selected from the same or different, unsaturated or saturated, branched or linear, aliphatic or aromatic alcohols having a total amount of carbon atoms from C6 to C30, preferably from C8 to C22, more preferably from C8 to C20, and most preferably from C8 to C18 in the alcohol substituent.

The term "salty reaction products of a phosphoric acid ester blend of one or more phosphoric acid mono-esters and/or one or more phosphoric acid di-esters" in the meaning of the present invention refers to products obtained by contacting a calcium carbonate-comprising filler material with one or more phosphoric acid mono-ester and one or more phosphoric acid di-ester and optionally phosphoric acid. Said salty reaction products are formed between the applied one or more phosphoric acid mono-ester and one or more phosphoric acid di-ester and optionally phosphoric acid and reactive molecules located at the surface of the filler material, preferably the at least one ground (especially wet ground) calcium carbonate-comprising filler material.

Alkyl esters of phosphoric acid are well known in the industry especially as surfactants, lubricants and antistatic agents (Die Tenside; Kosswig und Stache, Carl Hanser Verlag München, 1993).

The synthesis of alkyl esters of phosphoric acid by different methods and the surface treatment of minerals with alkyl esters of phosphoric acid are well known by the skilled man, e.g. from Pesticide Formulations and Application Systems: 15th Volume; Collins H M, Hall F R, Hopkinson M, STP1268; Published: 1996, U.S. Pat. Nos. 3,897,519 A, 4,921,990 A, 4,350,645 A, 6,710,199 B2, 4,126,650 A, 5,554,781 A, EP 1092000 B1 and WO 2008/023076 A1.

It is appreciated that the expression "one or more" phosphoric acid mono-ester means that one or more kinds of phosphoric acid mono-ester may be present in the phosphoric acid ester blend.

Accordingly, it should be noted that the one or more phosphoric acid mono-ester may be one kind of phosphoric acid mono-ester. Alternatively, the one or more phosphoric acid mono-ester may be a mixture of two or more kinds of phosphoric acid mono-ester. For example, the one or more phosphoric acid mono-ester may be a mixture of two or three kinds of phosphoric acid mono-ester, like two kinds of phosphoric acid mono-ester.

In one embodiment of the present invention, the one or more phosphoric acid mono-ester consists of an o-phosphoric acid molecule esterified with one alcohol selected from unsaturated or saturated, branched or linear, aliphatic or aromatic alcohols having a total amount of carbon atoms from C6 to C30 in the alcohol substituent. For example, the one or more phosphoric acid mono-ester consists of an o-phosphoric acid molecule esterified with one alcohol selected from unsaturated or saturated, branched or linear, aliphatic or aromatic alcohols having a total amount of carbon atoms from C8 to C22, more preferably from C8 to C20 and most preferably from C8 to C18 in the alcohol substituent.

In one embodiment of the present invention, the one or more phosphoric acid mono-ester consists of an o-phosphoric acid molecule esterified with one alcohol selected from saturated and linear or branched and aliphatic alcohols having a total amount of carbon atoms from C6 to C30 in the alcohol substituent. For example, the one or more phosphoric acid mono-ester consists of an o-phosphoric acid molecule esterified with one alcohol selected from saturated and linear or branched and aliphatic alcohols having a total amount of carbon atoms from C8 to C22, more preferably from C8 to C20 and most preferably from C8 to C18 in the alcohol substituent.

In one embodiment of the present invention, the one or more phosphoric acid mono-ester consists of an o-phosphoric acid molecule esterified with one alcohol selected from saturated and linear and aliphatic alcohols having a total amount of carbon atoms from C6 to C30, preferably from C8 to C22, more preferably from C8 to C20 and most preferably from C8 to C18 in the alcohol substituent. Alternatively, the one or more phosphoric acid mono-ester consists of an o-phosphoric acid molecule esterified with one alcohol selected from saturated and branched and aliphatic alcohols having a total amount of carbon atoms from C6 to C30, preferably from C8 to C22, more preferably from C8 to C20 and most preferably from C8 to C18 in the alcohol substituent.

In one embodiment of the present invention, the one or more phosphoric acid mono-ester is selected from the group comprising hexyl phosphoric acid mono-ester, heptyl phosphoric acid mono-ester, octyl phosphoric acid mono-ester, 2-ethylhexyl phosphoric acid mono-ester, nonyl phosphoric acid mono-ester, decyl phosphoric acid mono-ester, undecyl phosphoric acid mono-ester, dodecyl phosphoric acid mono-ester, tetradecyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof.

For example, the one or more phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof. In one embodiment of the present invention, the one or more phosphoric acid mono-ester is 2-octyl-1-dodecylphosphoric acid mono-ester.

It is appreciated that the expression "one or more" phosphoric acid di-ester means that one or more kinds of phosphoric acid di-ester may be present in the treatment layer of the surface-treated material product and/or the phosphoric acid ester blend.

Accordingly, it should be noted that the one or more phosphoric acid di-ester may be one kind of phosphoric acid di-ester. Alternatively, the one or more phosphoric acid di-ester may be a mixture of two or more kinds of phosphoric acid di-ester. For example, the one or more phosphoric acid di-ester may be a mixture of two or three kinds of phosphoric acid di-ester, like two kinds of phosphoric acid di-ester.

In one embodiment of the present invention, the one or more phosphoric acid di-ester consists of an o-phosphoric acid molecule esterified with two alcohols selected from unsaturated or saturated, branched or linear, aliphatic or aromatic alcohols having a total amount of carbon atoms from C6 to C30 in the alcohol substituent. For example, the one or more phosphoric acid di-ester consists of an o-phosphoric acid molecule esterified with two fatty alcohols selected from unsaturated or saturated, branched or linear, aliphatic or aromatic alcohols having a total amount of carbon atoms from C8 to C22, more preferably from C8 to C20 and most preferably from C8 to C18 in the alcohol substituent.

It is appreciated that the two alcohols used for esterifying the phosphoric acid may be independently selected from the same or different, unsaturated or saturated, branched or linear, aliphatic or aromatic alcohols having a total amount of carbon atoms from C6 to C30 in the alcohol substituent. In other words, the one or more phosphoric acid di-ester may comprise two substituents being derived from the same alcohols or the phosphoric acid di-ester molecule may comprise two substituents being derived from different alcohols.

In one embodiment of the present invention, the one or more phosphoric acid di-ester consists of an o-phosphoric acid molecule esterified with two alcohols selected from the same or different, saturated and linear or branched and aliphatic alcohols having a total amount of carbon atoms from C6 to C30 in the alcohol substituent. For example, the one or more phosphoric acid di-ester consists of an o-phosphoric acid molecule esterified with two alcohols selected from the same or different, saturated and linear or branched and aliphatic alcohols having a total amount of carbon atoms from C8 to C22, more preferably from C8 to C20 and most preferably from C8 to C18 in the alcohol substituent.

In one embodiment of the present invention, the one or more phosphoric acid di-ester consists of an o-phosphoric acid molecule esterified with two alcohols selected from the same or different, saturated and linear and aliphatic alcohols having a total amount of carbon atoms from C6 to C30, preferably from C8 to C22, more preferably from C8 to C20 and most preferably from C8 to C18 in the alcohol substituent. Alternatively, the one or more phosphoric acid di-ester consists of an o-phosphoric acid molecule esterified with two alcohols selected from the same or different, saturated and branched and aliphatic alcohols having a total amount of carbon atoms from C6 to C30, preferably from C8 to C22, more preferably from C8 to C20 and most preferably from C8 to C18 in the alcohol substituent.

In one embodiment of the present invention, the one or more phosphoric acid di-ester is selected from the group comprising hexyl phosphoric acid di-ester, heptyl phosphoric acid di-ester, octyl phosphoric acid di-ester, 2-ethylhexyl phosphoric acid di-ester, nonyl phosphoric acid di-ester, decyl phosphoric acid di-ester, undecyl phosphoric acid di-ester, dodecyl phosphoric acid di-ester, tetradecyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof.

For example, the one or more phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof. In one embodiment of the present invention, the one or more phosphoric acid di-ester is 2-octyl-1-dodecylphosphoric acid di-ester.

In one embodiment of the present invention, the one or more phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof and the one or more phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1- decylphosphoric acid di-ester, 2-octyl-1-dodecylphosphoric acid di-ester and mixtures thereof.

For example, at least a part of the surface of the calcium carbonate-comprising filler material comprises a phosphoric acid ester blend of one phosphoric acid mono-ester and salty reaction products thereof and one phosphoric acid di-ester and salty reaction products thereof. In this case, the one phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester and 2-octyl-1-dodecylphosphoric acid mono-ester, the one phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester and 2-octyl-1-dodecylphosphoric acid di-ester.

If at least a part of the surface of the at least one ground (especially wet ground) calcium carbonate-comprising filler material comprises a phosphoric acid ester blend of one phosphoric acid mono-ester and salty reaction products thereof and one phosphoric acid di-ester and salty reaction products thereof, it is appreciated that the alcohol substituent of the one phosphoric acid mono-ester and the one phosphoric acid di-ester are preferably the same. For example, at least a part of the surface of the at least one ground (especially wet ground) calcium carbonate-comprising filler material comprises a phosphoric acid ester blend of 2-ethylhexyl phosphoric acid mono-ester and salty reaction products thereof and 2-ethylhexyl phosphoric acid di-ester and salty reaction products thereof. Alternatively, at least a part of the surface of the at least one ground (especially wet ground) calcium carbonate-comprising filler material comprises a phosphoric acid ester blend of 2-octyl-1-decyl phosphoric acid mono-ester and salty reaction products thereof and 2-octyl-1-decyl phosphoric acid di-ester and salty reaction products thereof. Alternatively, at least a part of the surface of the at least one ground (especially wet ground) calcium carbonate-comprising filler material comprises a phosphoric acid ester blend of hexadecyl phosphoric acid mono-ester and salty reaction products thereof and hexadecyl phosphoric acid di-ester and salty reaction products thereof. Alternatively, at least a part of the surface of the at least one ground (especially wet ground) calcium carbonate-comprising filler material comprises a phosphoric acid ester blend of octadecyl phosphoric acid mono-ester and salty reaction products thereof and octadecyl phosphoric acid di-ester and salty reaction products thereof. Alternatively, at least a part of the surface of the at least one ground (especially wet ground) calcium carbonate-comprising filler material comprises a phosphoric acid ester blend of 2-octyl-1-dodecylphosphoric acid mono-ester and salty reaction products thereof and 2-octyl-1-dodecylphosphoric acid di-ester and salty reaction products thereof.

In one embodiment of the present invention, at least a part of the surface of the at least one ground (especially wet ground) calcium carbonate-comprising filler material comprises a phosphoric acid ester blend of two or more phosphoric acid mono-esters and salty reaction products thereof and two or more phosphoric acid di-ester and salty reaction products thereof. In this case, the two or more phosphoric acid mono-esters are selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decyl phosphoric acid mono-ester and 2-octyl-1-dodecylphosphoric acid mono-ester, the two or more phosphoric acid di-ester are selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decyl phosphoric acid di-ester and 2-octyl-1-dodecylphosphoric acid di-ester.

In one embodiment of the present invention, at least a part of the surface of the at least one ground (especially wet ground) calcium carbonate-comprising filler material comprises a phosphoric acid ester blend of two phosphoric acid mono-esters and salty reaction products thereof and two phosphoric acid di-esters and salty reaction products thereof. For example, at least a part of the surface of the at least one ground (especially wet ground) calcium carbonate-comprising filler material comprises a phosphoric acid ester blend of hexadecyl phosphoric acid mono-ester, octadecyl phosphoric acid mono-ester, hexadecyl phosphoric acid di-ester, octadecyl phosphoric acid di-ester and salty reaction products thereof and salty reaction products thereof.

According to one embodiment of the present invention, the phosphoric acid ester blend on at least a part of the surface of the at least one ground (especially wet ground) calcium carbonate-comprising filler material comprises the one or more phosphoric acid mono-ester and salty reaction products thereof to the one or more phosphoric acid di-ester and salty reaction products thereof in a specific molar ratio. In particular, the molar ratio of the one or more phosphoric acid mono-ester and salty reaction products thereof to the one or more phosphoric acid di-ester and salty reaction products thereof in the treatment layer and/or the phosphoric acid ester blend can be from 1:1 to 1:100.

The wording "molar ratio of the one or more phosphoric acid mono-ester and salty reaction products thereof to the one or more phosphoric acid di-ester and salty reaction products thereof" in the meaning of the present invention refers to the sum of the molecular weight of the phosphoric acid mono-ester molecules and the sum of the molecular weight of the phosphoric acid mono-ester molecules in the salty reaction products thereof to the sum of the molecular weight of the phosphoric acid di-ester molecules and the sum of the molecular weight of the phosphoric acid di-ester molecules in the salty reaction products thereof.

According to one embodiment the molar ratio of the one or more phosphoric acid mono-ester and salty reaction products thereof to the one or more phosphoric acid di-ester and salty reaction products thereof in the phosphoric acid ester blend is from 1:1 to 1:100, preferably from 1:1.1 to 1:80, more preferably from 1:1.1 to 1:60, even more preferably from 1:1.1 to 1:40, still even more preferably from 1:1.1 to 1:20, and most preferably from 1:1.1 to 1:10.

Additionally or alternatively, the phosphoric acid ester blend of the treatment layer comprises the one or more phosphoric acid mono-ester and salty reaction products thereof in an amount of from 1 to 50 mol.-%, based on the molar sum of the one or more phosphoric acid mono-ester and salty reaction products thereof and the one or more phosphoric acid di-ester and salty reaction products thereof. For example, the phosphoric acid ester blend of the treatment layer comprises the one or more phosphoric acid mono-ester and salty reaction products thereof in an amount of from 10 to 45 mol.-%, based on the molar sum of the one or more phosphoric acid mono-ester and salty reaction products thereof and the one or more phosphoric acid di-ester and salty reaction products thereof.

According to one embodiment of the present invention,
 I) the one or more phosphoric acid mono-ester consists of an o-phosphoric acid molecule mono-esterified with one alcohol molecule selected from unsaturated or saturated, branched or linear, aliphatic or aromatic alcohols having a total amount of carbon atoms from C6 to C30, preferably from C8 to C22, more preferably from C8 to C20, and most preferably from C8 to C18 in the alcohol substituent, and/or II) the one or more phosphoric acid di-ester consists of an o-phosphoric acid molecule di-esterified with two alcohol molecules selected from the same or different, unsaturated or saturated, branched or linear, aliphatic or aromatic fatty alcohols having a total amount of carbon atoms from C6 to C30, preferably from C8 to C22, more preferably from C8 to C20, and most preferably from C8 to C18 in the alcohol substituent.

In one embodiment of the present invention, the phosphoric acid ester blend of the treatment layer further comprises one or more phosphoric acid tri-ester and/or phosphoric acid and salty reaction products thereof.

The term "phosphoric acid tri-ester" in the meaning of the present invention refers to an o-phosphoric acid molecule tri-esterified with three alcohol molecules selected from the same or different, unsaturated or saturated, branched or linear, aliphatic or aromatic alcohols having a total amount of carbon atoms from C6 to C30, preferably from C8 to C22, more preferably from C8 to C20 and most preferably from C8 to C18 in the alcohol substituent.

It is appreciated that the expression "one or more" phosphoric acid tri-ester means that one or more kinds of phosphoric acid tri-ester may be present on at least a part of the surface of the at least one ground (especially wet ground) calcium carbonate-comprising filler material.

Accordingly, it should be noted that the one or more phosphoric acid tri-ester may be one kind of phosphoric acid tri-ester. Alternatively, the one or more phosphoric acid tri-ester may be a mixture of two or more kinds of phosphoric acid tri-ester. For example, the one or more phosphoric acid tri-ester may be a mixture of two or three kinds of phosphoric acid tri-ester, like two kinds of phosphoric acid tri-ester.

In one embodiment of the present invention, the one or more phosphoric acid tri-ester consists of an o-phosphoric acid molecule esterified with three alcohols selected from the same or different, unsaturated or saturated, branched or linear, aliphatic or aromatic alcohols having a total amount of carbon atoms from C6 to C30 in the alcohol substituent. For example, the one or more phosphoric acid tri-ester consists of an o-phosphoric acid molecule esterified with three alcohols selected from the same or different, unsaturated or saturated, branched or linear, aliphatic or aromatic fatty alcohols having a total amount of carbon atoms from C8 to C22, more preferably from C8 to C20 and most preferably from C8 to C18 in the alcohol substituent.

It is appreciated that the three alcohols used for esterifying the phosphoric acid may be independently selected from unsaturated or saturated, branched or linear, aliphatic or aromatic alcohols having a total amount of carbon atoms from C6 to C30 in the alcohol substituent. In other words, the one or more phosphoric acid tri-ester molecule may comprise three substituents being derived from the same alcohols or the phosphoric acid tri-ester molecule may comprise three substituents being derived from different alcohols.

In one embodiment of the present invention, the one or more phosphoric acid tri-ester consists of an o-phosphoric acid molecule esterified with three alcohols selected from the same or different, saturated and linear or branched and aliphatic alcohols having a total amount of carbon atoms from C6 to C30 in the alcohol substituent. For example, the one or more phosphoric acid tri-ester consists of an o-phosphoric acid molecule esterified with three alcohols selected from the same or different, saturated and linear or branched and aliphatic alcohols having a total amount of carbon atoms from C8 to C22, more preferably from C8 to C20 and most preferably from C8 to C18 in the alcohol substituent.

In one embodiment of the present invention, the one or more phosphoric acid tri-ester consists of an o-phosphoric acid molecule esterified with three alcohols selected from saturated and linear and aliphatic alcohols having a total amount of carbon atoms from C6 to C30, preferably from C8 to C22, more preferably from C8 to C20 and most preferably from C8 to C18 in the alcohol substituent. Alternatively, the one or more phosphoric acid tri-ester consists of an o-phosphoric acid molecule esterified with three alcohols selected from saturated and branched and aliphatic alcohols having a total amount of carbon atoms from C6 to C30, preferably from C8 to C22, more preferably from C8 to C20 and most preferably from C8 to C18 in the alcohol substituent.

In one embodiment of the present invention, the one or more phosphoric acid tri-ester is selected from the group comprising hexyl phosphoric acid tri-ester, heptyl phosphoric acid tri-ester, octyl phosphoric acid tri-ester, 2-ethylhexyl phosphoric acid tri-ester, nonyl phosphoric acid tri-ester, decyl phosphoric acid tri-ester, undecyl phosphoric acid tri-ester, dodecyl phosphoric acid tri-ester, tetradecyl phosphoric acid tri-ester, hexadecyl phosphoric acid tri-ester, heptylnonyl phosphoric acid tri-ester, octadecyl phosphoric acid tri-ester, 2-octyl-1-decylphosphoric acid tri-ester, 2-octyl-1-dodecylphosphoric acid tri-ester and mixtures thereof.

For example, the one or more phosphoric acid tri-ester is selected from the group comprising 2-ethylhexyl phosphoric acid tri-ester, hexadecyl phosphoric acid tri-ester, heptylnonyl phosphoric acid tri-ester, octadecyl phosphoric acid tri-ester, 2-octyl-1-decylphosphoric acid tri-ester, 2-octyl-1-dodecylphosphoric acid tri-ester and mixtures thereof.

In one embodiment of the present invention, at least a part of the surface of the at least one ground (especially wet ground) calcium carbonate-comprising filler material comprises a phosphoric acid ester blend of one or more phosphoric acid mono-ester and salty reaction products thereof and one or more phosphoric acid di-ester and salty reaction products thereof and one or more phosphoric acid tri-ester and optionally phosphoric acid and salty reaction products thereof. For example, at least a part of the surface of the at least one ground (especially wet ground) calcium carbonate-comprising filler material comprises a phosphoric acid ester blend of the one or more phosphoric acid mono-ester and salty reaction products thereof and one or more phosphoric acid di-ester and salty reaction products thereof and one or more phosphoric acid tri-ester and phosphoric acid and salty reaction products thereof.

Alternatively, at least a part of the surface of the at least one ground (especially wet ground) calcium carbonate-comprising filler material comprises a phosphoric acid ester blend of the one or more phosphoric acid mono-ester and salty reaction products thereof and one or more phosphoric acid di-ester and salty reaction products thereof and optionally phosphoric acid and salty reaction products thereof. For example, at least a part of the surface of the at least one ground (especially wet ground) calcium carbonate-comprising filler material comprises a phosphoric acid ester blend of the one or more phosphoric acid mono-ester and salty reaction products thereof and one or more phosphoric acid di-ester and salty reaction products thereof and phosphoric acid and salty reaction products thereof.

If at least a part of the surface of the at least one ground (especially wet ground) calcium carbonate-comprising filler material comprises a phosphoric acid ester blend comprising one or more phosphoric acid tri-ester, it is preferred that the phosphoric acid ester blend comprises the one or more phosphoric acid tri-ester in an amount of ≤10 mol.-%, based on the molar sum of the one or more phosphoric acid mono-ester and salty reaction products thereof and the one or more phosphoric acid di-ester and salty reaction products thereof and one or more phosphoric acid tri-ester and the phosphoric acid and salty reaction products thereof. For example, the phosphoric acid ester blend comprises the one or more phosphoric acid tri-ester in an amount of ≤8 mol.-%, preferably of ≤6 mol.-%, and more preferably of ≤4 mol.-%, like from 0.1 to 4 mol.-%, based on the molar sum of the one or more phosphoric acid mono-ester and salty reaction products thereof and the one or more phosphoric acid di-ester and salty reaction products thereof and one or more phosphoric acid tri-ester and the phosphoric acid and salty reaction products thereof.

Additionally or alternatively, if at least a part of the surface of the at least one ground (especially wet ground) calcium carbonate-comprising filler material comprises a phosphoric acid ester blend comprising phosphoric acid and salty reaction products thereof, it is preferred that the phosphoric acid ester blend comprises the phosphoric acid and salty reaction products thereof in an amount of ≤10 mol.-%, based on the molar sum of the one or more phosphoric acid mono-ester and salty reaction products thereof and the one or more phosphoric acid di-ester and salty reaction products thereof and one or more phosphoric acid tri-ester and the phosphoric acid and salty reaction products thereof. For example, the phosphoric acid ester blend comprises the phosphoric acid and salty reaction products thereof in an amount of ≤8 mol.-%, preferably of ≤6 mol.-%, and more preferably of ≤4 mol.-%, like from 0.1 to 4 mol.-%, based on the molar sum of the one or more phosphoric acid mono-ester and salty reaction products thereof and the one or more phosphoric acid di-ester and salty reaction products thereof and one or more phosphoric acid tri-ester and the phosphoric acid and salty reaction products thereof.

If the phosphoric acid ester blend further comprises phosphoric acid and salty reaction products thereof and one or more phosphoric acid tri-ester, it is thus preferred that the molar ratio of the phosphoric acid and salty reaction products thereof to the one or more phosphoric acid mono-ester and salty reaction products thereof to the one or more phosphoric acid di-ester and salty reaction products thereof to the one or more phosphoric acid tri-ester in the phosphoric acid ester blend is ≤10 mol.-%:≤40 mol.-%:≥40 mol.%:≤10 mol.-%, based on the molar sum of the one or more phosphoric acid mono-ester and salty reaction products thereof and the one or more phosphoric acid di-ester and salty reaction products thereof and the one or more phosphoric acid tri-ester and the phosphoric acid and salty reaction products thereof.

The wording "molar ratio of the phosphoric acid and salty reaction products thereof to the one or more phosphoric acid mono-ester and salty reaction products thereof to the one or more phosphoric acid di-ester and salty reaction products thereof to the one or more phosphoric acid tri-ester" in the meaning of the present invention refers to the sum of the molecular weight of the phosphoric acid and the sum of the molecular weight of the phosphoric acid molecules in the salty reaction products thereof to the sum of the molecular weight of the phosphoric acid mono-ester molecules and the sum of the molecular weight of the phosphoric acid mono-ester molecules in the salty reaction products thereof to the sum of the molecular weight of the phosphoric acid di-ester molecules and the sum of the molecular weight of the phosphoric acid di-ester molecules in the salty reaction products thereof to the sum of the molecular weight of the phosphoric acid tri-ester molecules.

It is appreciated that the phosphoric acid ester blend may comprise salty reaction products obtained from contacting the at least one filler material, preferably the at least one ground (especially wet ground) calcium carbonate-comprising filler material, with the one or more phosphoric acid mono-ester and one or more phosphoric acid di-ester and optionally phosphoric acid. In such a case, the phosphoric acid ester blend preferably comprises salty reaction products such as one or more calcium, magnesium and/or aluminium salts of phosphoric acid mono-esters and one or more calcium, magnesium and/or aluminium salts of phosphoric acid di-ester and optionally one or more calcium, magnesium and/or aluminium salts of phosphoric acid. Preferably, the phosphoric acid ester blend comprises salty reaction products such as one or more calcium and/or magnesium salts of phosphoric acid mono-esters and one or more calcium and/or magnesium salts of phosphoric acid di-ester and optionally one or more calcium and/or magnesium salts of phosphoric acid.

In one embodiment of the present invention, the one or more phosphoric acid mono-ester and/or the one or more phosphoric acid di-ester and optionally the phosphoric acid may be at least partially neutralized by one or more hydroxides of a mono- and/or bi- and/or trivalent cation and/or one or more salts of a weak acid of a mono- and/or bi- and/or trivalent cation before the at least one filler material, preferably the at least one ground (especially wet ground) calcium carbonate-comprising filler material, is prepared. The one or more hydroxides of a bi- and/or trivalent cation may be selected from $Ca(OH)_2$, $Mg(OH)_2$, $Al(OH)_3$ and mixtures thereof.

Additionally or alternatively, if the one or more phosphoric acid mono-ester and/or the one or more phosphoric acid di-ester and optionally the phosphoric acid is at least partially neutralized by one or more hydroxides and/or one or more salts of a weak acid of a monovalent cation, the amount of monovalent cations is preferably ≤10 mol.-%, based on the molar sum of acidic groups in the one or more phosphoric acid mono-ester and the one or more phosphoric acid di-ester and optionally the phosphoric acid, the one or more hydroxide and/or the one or more salt of a weak acid of a monovalent cation to neutralize may be selected from LiOH, NaOH, KOH, $Na_2CO_3$, $Li_2CO_3$, $K_2CO_3$ and mixtures thereof.

In one embodiment of the present invention, the bivalent cations used for the partial neutralization of the one or more phosphoric acid mono-ester and/or the one or more phosphoric acid di-ester and optional the phosphoric acid are derived from salts of weak acids of such cations, preferably from carbonates and/or borates, such as calcium carbonate.

The term "weak acid" in the meaning of the present application refers to a Bronsted-Lowry acid, i.e. an $H_3O^+$-ion provider, featuring a $pK_a$ of >2, preferably from 4 to 7.

Accordingly, the phosphoric acid ester blend of the treatment layer may further comprise salty reaction products such as one or more calcium and/or magnesium salts of phosphoric acid mono-esters and one or more calcium and/or magnesium salts of phosphoric acid di-ester and optionally one or more calcium and/or magnesium salts of phosphoric acid. Additionally or alternatively, the phosphoric acid ester blend of the treatment layer further comprises salty reaction products such as one or more aluminium salts of phosphoric acid mono-esters and one or more aluminium salts of phosphoric acid di-ester and optionally one or more aluminium salts of phosphoric acid. Additionally or alternatively, the phosphoric acid ester blend of the treatment layer further comprises salty reaction products such as one or more lithium salts of phosphoric acid mono-esters and one or more lithium salts of phosphoric acid di-ester and optionally one or more lithium salts of phosphoric acid. Additionally or alternatively, the phosphoric acid ester blend of the treatment layer further comprises salty reaction products such as one or more sodium salts of phosphoric acid mono-esters and one or more sodium salts of phosphoric acid di-ester and optionally one or more sodium salts of phosphoric acid. Additionally or alternatively, the phosphoric acid ester blend of the treatment layer further comprises salty reaction products such as one or more potassium salts of phosphoric acid mono-esters and one or more potassium salts of phosphoric acid di-ester and optionally one or more potassium salts of phosphoric acid.

If the one or more phosphoric acid mono-ester and/or the one or more phosphoric acid di-ester and optionally the phosphoric acid is at least partially neutralized by one or more hydroxides and/or one or more salts of a weak acid of a monovalent cation, the treatment layer and/or the phosphoric acid ester blend preferably comprises an amount of monovalent cations of ≤10 mol.-%, based on the molar sum of acidic groups in the one or more phosphoric acid mono-ester and the one or more phosphoric acid di-ester and optionally the phosphoric acid.

In one embodiment of the present invention, the phosphoric acid ester blend of the treatment layer may further comprise additional surface treatment agents that do not correspond to the one or more phosphoric acid mono-ester, one or more phosphoric acid di-ester and the optional one or more phosphoric acid tri-ester and/or phosphoric acid of the present invention.

In one embodiment, the molar ratio of the one or more phosphoric acid mono-ester and/or the one or more phosphoric acid di-ester to the salty reaction products thereof is from 99.9:0.1 to 0.1:99.9, preferably from 70:30 to 90:10.

The wording "molar ratio of the one or more phosphoric acid mono-ester and/or the one or more phosphoric acid di-ester to the salty reaction products thereof" in the meaning of the present invention refers to the sum of the molecular weight of the phosphoric acid mono-ester molecules and/or the sum of the molecular weight of the phosphoric acid di-ester molecules to the sum of the molecular weight of the phosphoric acid mono-ester molecules in the salty reaction products thereof and/or the sum of the phosphoric acid di-ester molecules in the salty reaction products thereof.

According to another embodiment of the present invention, the surface-treated filler material product comprises a treatment layer on at least a part of the surface of the at least one ground (especially wet ground) calcium carbonate-comprising filler material, wherein the treatment layer comprises at least one saturated aliphatic linear or branched carboxylic acid and salty reaction products thereof or at least one polydialkylsiloxane.

Methods for preparing the surface-treated filler material product treated with at least one phosphoric acid ester blend and suitable compounds for coating are described e.g. in EP 2 770 017 A1, which is thus incorporated herewith by reference.

In an alternative embodiment, the treatment layer comprises an aliphatic carboxylic acid having a total amount of carbon atoms from C4 to C24 and/or reaction products thereof.

The term "salty reaction products" of the aliphatic linear or branched carboxylic acid in the meaning of the present invention refers to products obtained by contacting the at least one ground (especially wet ground) calcium carbonate-comprising filler material with the at least one aliphatic linear or branched carboxylic acid. Said reaction products are formed between at least a part of the applied at least one aliphatic linear or branched carboxylic acid and reactive molecules located at the surface of the at least one filler material, preferably the at least one ground (especially wet ground) calcium carbonate-comprising filler material.

The aliphatic carboxylic acid in the meaning of the present invention may be selected from one or more linear chain, branched chain, saturated, unsaturated and/or alicyclic carboxylic acids. Preferably, the aliphatic carboxylic acid is a monocarboxylic acid, i.e. the aliphatic carboxylic acid is characterized in that a single carboxyl group is present. Said carboxyl group is placed at the end of the carbon skeleton.

In one embodiment of the present invention, the aliphatic linear or branched carboxylic acid is selected from saturated unbranched carboxylic acids, that is to say the aliphatic carboxylic acid is preferably selected from the group of carboxylic acids consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid and mixtures thereof.

In another embodiment of the present invention, the aliphatic linear or branched carboxylic acid is selected from the group consisting of octanoic acid, decanoic acid, lauric acid, myristic acid, palmitic acid, stearic acid, arachidic acid and mixtures thereof. Preferably, the aliphatic linear or branched carboxylic acid is selected from the group consisting of octanoic acid, myristic acid, palmitic acid, stearic acid and mixtures thereof.

For example, the aliphatic linear or branched carboxylic acid is octanoic acid or stearic acid. Preferably, the aliphatic linear or branched carboxylic acid is stearic acid.

In one embodiment, the molar ratio of the at least one saturated aliphatic linear or branched carboxylic acid to the salty reaction product(s) thereof is from 99.9:0.1 to 0.1:99.9, preferably from 70:30 to 90:10.

The wording "molar ratio of the at least one saturated aliphatic linear or branched carboxylic acid to the salty reaction product(s) thereof" in the meaning of the present invention refers to the sum of the molecular weight of the saturated aliphatic linear or branched carboxylic acid to the sum of the molecular weight of the saturated aliphatic linear or branched carboxylic acid in the salty reaction products.

According to another embodiment of the present invention, the surface treated filler material comprises a treatment layer on at least a part of the surface of the at least one ground (especially wet ground) calcium carbonate-comprising filler material, wherein the treatment layer comprises at least one aliphatic aldehyde and/or salty reaction products thereof.

In this regard, the at least one aliphatic aldehyde represents a surface treatment agent and may be selected from any linear, branched or alicyclic, substituted or non-substituted, saturated or unsaturated aliphatic aldehyde. Said aldehyde is preferably chosen such that the number of carbon atoms is greater than or equal to 6 and more preferably greater than or equal to 8. Furthermore, said aldehyde has generally a number of carbon atoms that is lower or equal to 14, preferably lower or equal to 12 and more preferably lower or equal to 10. In one preferred embodiment, the number of carbon atoms of the aliphatic aldehyde is between 6 and 14, preferably between 6 and 12 and more preferably between 6 and 10.

In another preferred embodiment, the at least one aliphatic aldehyde is preferably chosen such that the number of carbon atoms is between 6 and 12, more preferably between 6 and 9, and most preferably 8 or 9.

The aliphatic aldehyde may be selected from the group of aliphatic aldehydes consisting of hexanal, (E)-2-hexenal, (Z)-2-hexenal, (E)-3-hexenal, (Z)-3-hexenal, (E)-4-hexenal, (Z)-4-hexenal, 5-hexenal, heptanal, (E)-2-heptenal, (Z)-2-heptenal, (E)-3-heptenal, (Z)-3-heptenal, (E)-4-heptenal, (Z)-4-heptenal, (E)-5-heptenal, (Z)-5-heptenal, 6-heptenal, octanal, (E)-2-octenal, (Z)-2-octenal, (E)-3-octenal, (Z)-3-octenal, (E)-4-octenal, (Z)-4-octenal, (E)-5-octenal, (Z)-5-octenal, (E)-6-octenal, (Z)-6-octenal, 7-octenal, nonanal, (E)-2-nonenal, (Z)-2-nonenal, (E)-3-nonenal, (Z)-3-nonenal, (E)-4-nonenal, (Z)-4-nonenal, (E)-5-nonenal, (Z)-5-nonenal, (E)-6-nonenal, (Z)-6-nonenal, (E)-6-nonenal, (Z)-6-nonenal, (E)-7-nonenal, (Z)-7-nonenal, 8-nonenal, decanal, (E)-2-decenal, (Z)-2-decenal, (E)-3-decenal, (Z)-3-decenal, (E)-4-decenal, (Z)-4-decenal, (E)-5-decenal, (Z)-5-decenal, (E)-6-decenal, (Z)-6-decenal, (E)-7-decenal, (Z)-7-decenal, (E)-8-decenal, (Z)-8-decenal, 9-decenal, undecanal, (E)-2-undecenal, (Z)-2-undecenal, (E)-3-undecenal, (Z)-3-undecenal, (E)-4-undecenal, (Z)-4-undecenal, (E)-5-undecenal, (Z)-5-undecenal, (E)-6-undecenal, (Z)-6-undecenal, (E)-7-undecenal, (Z)-7-undecenal, (E)-8-undecenal, (Z)-8-undecenal, (E)-9-undecenal, (Z)-9-undecenal, 10-undecenal, dodecanal, (E)-2-dodecenal, (Z)-2-dodecenal, (E)-3-dodecenal, (Z)-3-dodecenal, (E)-4-dodecenal, (Z)-4-dodecenal, (E)-5-dodecenal, (Z)-5-dodecenal, (E)-6-dodecenal, (Z)-6-dodecenal, (E)-7-dodecenal, (Z)-7-dodecenal, (E)-8-dodecenal, (Z)-8-dodecenal, (E)-9-dodecenal, (Z)-9-dodecenal, (E)-10-dodecenal, (Z)-10-dodecenal, 11-dodecenal, tridecanal, (E)-2-tridecenal, (Z)-2-tridecenal, (E)-3-tridecenal, (Z)-3-tridecenal, (E)-4-tridecenal, (Z)-4-tridecenal, (E)-5-tridecenal, (Z)-5-tridecenal, (E)-6-tridecenal, (Z)-6-tridecenal, (E)-7-tridecenal, (Z)-7-tridecenal, (E)-8-tridecenal, (Z)-8-tridecenal, (E)-9-tridecenal, (Z)-9-tridecenal, (E)-10-tridecenal, (Z)-10-tridecenal, (E)-11-tridecenal, (Z)-11-tridecenal, 12-tridecenal, butadecanal, (E)-2-butadecenal, (Z)-2-butadecenal, (E)-3-butadecenal, (Z)-3-butadecenal, (E)-4-butadecenal, (Z)-4-butadecenal, (E)-5-butadecenal, (Z)-5-butadecenal, (E)-6-butadecenal, (Z)-6-butadecenal, (E)-7-butadecenal, (Z)-7-butadecenal, (E)-8-butadecenal, (Z)-8-butadecenal, (E)-9-butadecenal, (Z)-9-butadecenal, (E)-10-butadecenal, (Z)-10-butadecenal, (E)-11-butadecenal, (Z)-11-butadecenal, (E)-12-butadecenal, (Z)-12-butadecenal, 13-butadecenal, and mixtures thereof. In a preferred embodiment, the aliphatic aldehyde is selected from the group consisting of hexanal, (E)-2-hexenal, (Z)-2-hexenal, (E)-3-hexenal, (Z)-3-hexenal, (E)-4-hexenal, (Z)-4-hexenal, 5-hexenal, heptanal, (E)-2-heptenal, (Z)-2-heptenal, (E)-3-heptenal, (Z)-3-heptenal, (E)-4-heptenal, (Z)-4-heptenal, (E)-5-heptenal, (Z)-5-heptenal, 6-heptenal, octanal, (E)-2-octenal, (Z)-2-octenal, (E)-3-octenal, (Z)-3-octenal, (E)-4-octenal, (Z)-4-octenal, (E)-5-octenal, (Z)-5-octenal, (E)-6-octenal, (Z)-6-octenal, 7-octenal, nonanal, (E)-2-nonenal, (Z)-2-nonenal, (E)-3-nonenal, (Z)-3-nonenal, (E)-4-nonenal, (Z)-4-nonenal, (E)-5-nonenal, (Z)-5-nonenal, (E)-6-nonenal, (Z)-6-nonenal, (E)-7-nonenal, (Z)-7-nonenal, 8-nonenal and mixtures thereof.

In another preferred embodiment, the at least one aliphatic aldehyde is a saturated aliphatic aldehyde. In this case the aliphatic aldehyde is selected from the group consisting of hexanal, heptanal, octanal, nonanal, decanal, undecanal, dodecanal, tridecanal, butadecanal and mixtures thereof. Preferably, the at least one aliphatic aldehyde in the form of a saturated aliphatic aldehyde is selected from the group consisting of hexanal, heptanal, octanal, nonanal, decanal, undecanal, dodecanal and mixtures thereof. For instance, the at least one aliphatic aldehyde in the form of a saturated aliphatic aldehyde is selected from octanal, nonanal and mixtures thereof.

If a mixture of two aliphatic aldehydes, e.g. two saturated aliphatic aldehydes such as octanal and nonanal is used according to the present invention, the weight ratio of octanal and nonanal is from 70:30 to 30:70 and more preferably from 60:40 to 40:60. In one especially preferred embodiment of the present invention, the weight ratio of octanal and nonanal is about 1:1.

The term "salty reaction products" of the at least one aliphatic aldehyde in the meaning of the present invention refers to products obtained by contacting the at least one ground (especially wet ground) calcium carbonate-comprising filler material with the at least one aliphatic aldehyde. Said reaction products are formed between at least a part of the applied at least one aliphatic aldehyde and reactive molecules located at the surface of the at least one filler material, preferably the at least one ground (especially wet ground) calcium carbonate-comprising filler material.

In one embodiment, the molar ratio of the at least one aliphatic aldehyde to the salty reaction product(s) thereof is from 99.9:0.1 to 0.1:99.9, preferably from 70:30 to 90:10.

The wording "molar ratio of the at least one aliphatic aldehyde to the salty reaction product(s) thereof" in the meaning of the present invention refers to the sum of the molecular weight of the aliphatic aldehyde to the sum of the molecular weight of the aliphatic aldehyde in the salty reaction products.

Methods for preparing the surface-treated filler material product treated with at least one aliphatic aldehyde and suitable compounds for coating are described e.g. in EP 2 390 285 A1, which is thus incorporated herewith by reference.

According to another embodiment of the present invention, the surface treated filler material comprises a treatment layer on at least a part of the surface of the at least one ground (especially wet ground) calcium carbonate-comprising filler material, wherein the treatment layer comprises at least one polydialkylsiloxane.

Preferred polydialkylsiloxanes are described e.g. in US 2004/0097616 A1. Most preferred are polydialkylsiloxanes selected from the group consisting of polydimethylsiloxane, preferably dimethicone, polydiethylsiloxane and polymethylphenylsiloxane and/or mixtures thereof.

For example, the at least one polydialkylsiloxane is preferably a polydimethylsiloxane (PDMS).

The at least one polydialkylsiloxane is preferably present in a quantity such that the total amount of said polydialkylsiloxane on at least a part of the surface of the at least one ground (especially wet ground) calcium carbonate-comprising filler material, is less than 1 000 ppm, more preferably less than 800 ppm and most preferably less than 600 ppm. For example, the total amount of the polydialkylsiloxane on at least a part of the surface of the at least one ground (especially wet ground) calcium carbonate-comprising filler material, is from 100 to 1000 ppm, more preferably from 200 to 800 ppm and most preferably from 300 to 600 ppm, e.g. from 400 to 600 ppm.

In one embodiment, the treatment layer on at least a part of the surface of the at least one ground (especially wet ground) calcium carbonate-comprising filler material comprises a mixture of the above materials.

For example, the treatment layer on at least a part of the surface of the at least one ground (especially wet ground) calcium carbonate-comprising filler material comprises a phosphoric acid ester blend of one or more phosphoric acid mono-ester and salty reaction products thereof and/or one or more phosphoric acid di-ester and salty reaction products thereof and at least one saturated aliphatic linear or branched carboxylic acid and salty reaction products thereof and optionally at least one polydialkylsiloxane or optionally at least one aliphatic aldehyde and/or salty reaction products thereof.

Alternatively, the treatment layer on at least a part of the surface of the at least one ground (especially wet ground) calcium carbonate-comprising filler material comprises a phosphoric acid ester blend of one or more phosphoric acid mono-ester and salty reaction products thereof and/or one or more phosphoric acid di-ester and salty reaction products thereof and at least one polydialkylsiloxane and optionally at least one saturated aliphatic linear or branched carboxylic acid and salty reaction products thereof or optionally at least one aliphatic aldehyde and/or salty reaction products thereof.

Alternatively, the treatment layer on at least a part of the surface of the at least one ground (especially wet ground) calcium carbonate-comprising filler material comprises at least one saturated aliphatic linear or branched carboxylic acid and salty reaction products thereof and at least one polydialkylsiloxane and optionally a phosphoric acid ester blend of one or more phosphoric acid mono-ester and salty reaction products thereof and/or one or more phosphoric acid di-ester and salty reaction products thereof or optionally at least one aliphatic aldehyde and/or salty reaction products thereof.

Alternatively, the treatment layer on at least a part of the surface of the at least one ground (especially wet ground) calcium carbonate-comprising filler material comprises at least one aliphatic aldehyde and/or salty reaction products thereof and at least one saturated aliphatic linear or branched carboxylic acid and salty reaction products thereof and optionally at least one polydialkylsiloxane or optionally a phosphoric acid ester blend of one or more phosphoric acid mono-ester and salty reaction products thereof and/or one or more phosphoric acid di-ester and salty reaction products thereof or optionally at least one aliphatic aldehyde and/or salty reaction products thereof.

Alternatively, the treatment layer on at least a part of the surface of the at least one ground (especially wet ground) calcium carbonate-comprising filler material comprises at least one aliphatic aldehyde and/or salty reaction products thereof and at least one polydialkylsiloxane and optionally at least one saturated aliphatic linear or branched carboxylic acid and salty reaction products thereof or optionally a phosphoric acid ester blend of one or more phosphoric acid mono-ester and salty reaction products thereof and/or one or more phosphoric acid di-ester and salty reaction products thereof or optionally at least one aliphatic aldehyde and/or salty reaction products thereof.

Preferably, the treatment layer on at least a part of the surface of the at least one ground (especially wet ground) calcium carbonate-comprising filler material comprises a phosphoric acid ester blend of one or more phosphoric acid mono-ester and salty reaction products thereof and/or one or more phosphoric acid di-ester and salty reaction products thereof or at least one saturated aliphatic linear or branched carboxylic acid and salty reaction products thereof or at least one aliphatic aldehyde and/or salty reaction products thereof and at least one polydialkylsiloxane. More preferably, the treatment layer on at least a part of the surface of the at least one ground (especially wet ground) calcium carbonate-comprising filler material comprises, most preferably consists of, at least one saturated aliphatic linear or branched carboxylic acid and salty reaction products thereof and at least one polydialkylsiloxane.

Thus, an after treatment layer may be present on the treatment layer, said after treatment layer preferably comprises at least one polydialkylsiloxane.

In one preferred embodiment the surface treatment of the at least one ground (especially wet ground) calcium carbonate-comprising filler material is carried out in two steps, the first step comprising a treatment by a phosphoric acid ester blend of one or more phosphoric acid mono-ester and/or one or more phosphoric acid di-ester or at least one saturated aliphatic linear or branched carboxylic acid or at least one aliphatic aldehyde for forming a treatment layer and the second step comprising a treatment by at least one polydialkylsiloxane for forming an after treatment layer.

In another embodiment the surface treatment is carried out by treating the at least one ground (especially wet ground) calcium carbonate-comprising filler material simultaneously with a phosphoric acid ester blend of one or more phosphoric acid mono-ester and/or one or more phosphoric acid di-ester or at least one saturated aliphatic linear or branched carboxylic acid or at least one aliphatic aldehyde and at least one polydialkylsiloxane for forming a treatment layer.

Furthermore, the surface treatment can be carried out by treating the at least one ground (especially wet ground) calcium carbonate-comprising filler material first with a polydialkylsiloxane and subsequently with phosphoric acid ester blend of one or more phosphoric acid mono-ester and/or one or more phosphoric acid di-ester or at least one saturated aliphatic linear or branched carboxylic acid or at least one aliphatic aldehyde.

According to one embodiment the salty reaction product(s) of the phosphoric acid ester, the blend of one or more phosphoric acid mono-ester, the one or more phosphoric acid di-ester or the at least one saturated aliphatic linear or branched carboxylic acid or the at least one aliphatic aldehyde are one or more calcium and/or magnesium salts thereof.

Thus, it is appreciated that the at least one ground (especially wet ground) calcium carbonate-comprising filler material product comprises, and preferably consists of, at least one ground (especially wet ground) calcium carbonate-comprising filler material and a treatment layer comprising i. a phosphoric acid ester blend of one or more phosphoric acid mono-ester and salty reaction products thereof and/or one or more phosphoric acid di-ester and salty reaction products thereof, and/or ii. at least one saturated aliphatic linear or branched carboxylic acid and salty reaction products thereof, and/or iii. at least one aliphatic aldehyde and/or salty reaction products thereof, and/or
iv. at least one polydialkylsiloxane, and/or
v. mixtures of the materials according to i. to iv.

The treatment layer is formed on the surface of said at least one ground (especially wet ground) calcium carbonate-comprising filler material.

It is one requirement of the present invention that the surface-treated filler material product comprises the treatment layer in an amount from 0.1 to 3 wt.-%, based on the total dry weight of the at least one ground (especially wet ground) calcium carbonate-comprising filler material.

According to one embodiment the surface-treated filler material product comprises the treatment layer in an amount of from 0.1 to 2.8 wt.-%, more preferably in an amount of from 0.1 to 2.5 wt.-%, even more preferably in an amount of from 0.3 to 2.5 wt.-% and most preferably in an amount of from 0.5 to 2.5 wt.-% based on the total dry weight of the at least one ground (especially wet ground) calcium carbonate-comprising filler material.

The treatment layer is preferably characterized in that the total weight of the phosphoric acid ester blend of one or more phosphoric acid mono-ester and salty reaction products thereof and/or one or more phosphoric acid di-ester and salty reaction products thereof, and/or at least one saturated aliphatic linear or branched carboxylic acid and salty reaction products thereof, and/or at least one aliphatic aldehyde and/or salty reaction products thereof, and/or at least one polydialkylsiloxane, and/or mixtures of said materials on the surface of the surface-treated filler material product is from 0.05 to 1 wt.-%/$m^2$, more preferably from 0.1 to 0.5 wt.-%/$m^2$ and most preferably from 0.15 to 0.25 wt.-%/$m^2$ of the at least one ground (especially wet ground) calcium carbonate-comprising filler material.

In one embodiment of the present invention, the treatment layer is characterized in that the total weight of the phosphoric acid ester blend of one or more phosphoric acid mono-ester and salty reaction products thereof and/or one or more phosphoric acid di-ester and salty reaction products thereof, and/or at least one saturated aliphatic linear or branched carboxylic acid and salty reaction products thereof, and/or at least one aliphatic aldehyde and/or salty reaction products thereof, and/or at least one polydialkylsiloxane, and/or mixtures of said materials on the surface of the surface-treated filler material product is from 0.1 to 5 mg/$m^2$, more preferably from 0.25 to 4.5 mg/$m^2$ and most preferably from 1.0 to 4.0 mg/$m^2$ of the at least one calcium carbonate-comprising material.

In particular, it is appreciated that the surface-treated filler material product features a volatile onset temperature≥250° C. For example, the surface-treated filler material product obtained by the inventive process features a volatile onset temperature≥260° C. or ≥270° C.

Additionally or alternatively, the surface-treated filler material product features a total volatiles between 25 and 350° C. of less than 0.25%, and preferably of less than 0.23% by mass, e.g. of from 0.04 to 0.21% by mass, preferably from 0.08 to 0.15% by mass, more preferably from 0.1 to 0.12% by mass.

Furthermore, the surface-treated filler material product features a low water pick up susceptibility. It is preferred that the moisture pick up susceptibility of the surface-treated filler material product is such that its total surface moisture level is less than 1 mg/g of dry calcium carbonate-comprising filler material, at a temperature of about +23° C. (±2° C.). For example, the surface-treated filler material product has a moisture pick up susceptibility of from 0.1 to 1 mg/g, more preferably of from 0.2 to 0.9 mg/g and most preferably of from 0.2 to 0.8 mg/g of dry calcium carbonate-comprising material after at a temperature of +23 C (±2° C.).

Additionally or alternatively, the surface-treated filler material product has a hydrophilicity of below 8:2 volumetric ratio of water:ethanol measured at +23° C. (±2° C.) with the sedimentation method. For example, the surface-treated filler material product has a hydrophilicity of below 7:3 volumetric ratio of water:ethanol measured at +23° C. (±2° C.) with the sedimentation method.

According to one embodiment the breathable film comprises the surface-treated filler material product in an amount from 1 to 85 wt.-%, based on the total weight of the breathable film, preferably from 2 to 80 wt.-%, more preferably from 5 to 75 wt.-%, even more preferably from 10 to 65 wt.-%, and most preferably from 15 wt.-% to 60 wt.-%.

According to one aspect of the present invention, the surface-treated filler material product described above is used as filler in a breathable film.

Breathable Film

According to the present invention a breathable film comprising at least one thermoplastic polymer and a surface-treated filler material product is provided, wherein the surface-treated filler material product comprises
A) at least one ground (especially wet ground) calcium carbonate-comprising filler material having
a weight median particle size $d_{50}$ in the range from 0.1 µm to 7 µm,
a top cut particle size $d_{98}$ of ≤15 µm,
a specific surface area (BET) from 0.5 to 150 $m^2$/g, as measured using nitrogen and the BET method according to ISO 9277, and
a residual total moisture content of ≤1 wt.-%, based on the total dry weight of the at least one ground calcium carbonate-comprising filler material, and
B) a treatment layer on the surface of the at least one ground calcium carbonate-comprising filler material comprising
i. a phosphoric acid ester blend of one or more phosphoric acid mono-ester and salty reaction products thereof and/or one or more phosphoric acid di-ester and salty reaction products thereof, and/or
ii. at least one saturated aliphatic linear or branched carboxylic acid and salty reaction products thereof, and/or
iii. at least one aliphatic aldehyde and/or salty reaction products thereof, and/or
iv. at least one polydialkylsiloxane, and/or
v. mixtures of the materials according to i. to iii.,
wherein the surface-treated filler material product comprises the treatment layer in an amount of from 0.1 to 3 wt.-%, based on the total dry weight of the at least one ground calcium carbonate-comprising filler material.

It is appreciated that the breathable especially features a low basis weight. Thus, the breathable film has a basis weight from 1 to 10 g/$m^2$. In one embodiment, the breathable film has a basis weight from 5 to 10 g/$m^2$, preferably from 6 to 10 g/$m^2$, and most preferably about 8 g/$m^2$.

According to one embodiment, the thickness of the breathable film is from 4 to 10 µm, preferably from 6 to 10 µm.

The breathable film is advantageous as it provides a low basis weight at high mechanical properties.

For example, at a basis weight of 8 g/$m^2$, the breathable film has a force at break in machine direction, measured according to ISO 527-3, in the range from 4 to 40 N, more preferably in the range from 4 to 35 N and most preferably in the range from 4 to 35 N.

If the at least one thermoplastic polymer comprises a polyethylene, e.g. a LLDPE, the breathable film, at a basis weight of 8 g/m$^2$, has preferably a force at break in machine direction, measured according to ISO 527-3, in the range from 4 to 15 N, and more preferably in the range from 4 to 12 N.

If the at least one thermoplastic polymer comprises a polypropylene, the breathable film, at a basis weight of 8 g/m$^2$, has preferably a force at break in machine direction, measured according to ISO 527-3, in the range from 10 to 30 N, more preferably in the range from 14 to 25 N and most preferably in the range from 20 to 23 N.

Additionally or alternatively, at a basis weight of 8 g/m$^2$, the breathable film has a modulus of elasticity, measured according to ISO 527-3, in the range from 300 to 2500 N/mm$^2$, and most preferably in the range from 500 to 2400 N/mm$^2$.

If the at least one thermoplastic polymer comprises a polyethylene, e.g. a LLDPE, the breathable film, at a basis weight of 8 g/m$^2$, has preferably a modulus of elasticity, measured according to ISO 527-3, in the range from 300 to 1000 N/mm$^2$, and most preferably in the range from 500 to 800 N/mm$^2$.

If the at least one thermoplastic polymer comprises a polypropylene, the breathable film, at a basis weight of 8 g/m$^2$, has preferably a modulus of elasticity, measured according to ISO 527-3, in the range from 1000 to 2500 N/mm$^2$, more preferably in the range from 1100 to 2400 N/mm$^2$ and most preferably in the range from 2000 to 2300 N/mm$^2$.

Additionally or alternatively, at a basis weight of 8 g/m$^2$, the breathable film has a water column, measured in accordance with the method outlined in the example section, in the range from 50 to 700 mbar, and most preferably in the range from 75 to 600 mbar.

If the at least one thermoplastic polymer comprises a polyethylene, e.g. a LLDPE, the breathable film, at a basis weight of 8 g/m$^2$, has preferably a water column, measured in accordance with the method outlined in the example section, in the range from 75 to 500 mbar, and most preferably in the range from 150 to 300 mbar.

If the at least one thermoplastic polymer comprises a polypropylene, the breathable film, at a basis weight of 8 g/m$^2$, has preferably a water column, measured in accordance with the method outlined in the example section, in the range from 100 to 700 mbar, more preferably in the range from 300 to 600 mbar and most preferably in the range from 400 to 500 mbar.

Furthermore, it is appreciated that the breathable film has a good surface quality and a reduced potential of skin irritation.

The breathability of the breathable film can be measured by its water vapour transmission rate. According to one embodiment the breathable film has a water vapour transmission rate (WVTR) from 500 to 10 000 g/(m$^2$·day), preferably from 750 to 8000 g/(m$^2$·day), and more preferably from 1000 to 7000 g/(m$^2$·day), measured with a Lyssy L80-5000 measuring device according to ASTM 398.

According to one embodiment the breathable film has a hydrostatic pressure from 100 to 500 mbar, preferably from 200 to 400 mbar, and more preferably from 250 to 350 mbar, measured with a FX 3000 Hydrotester according to the method which has been described above.

According to one embodiment the breathable film further comprises additives selected from the group consisting of UV-absorbers, light stabilizers, processing stabilizers, antioxidants, heat stabilizers, nucleating agents, metal deactivators, impact modifiers, plasticizers, lubricants, rheology modifiers, processing aids, pigments, dyes, optical brighteners, antimicrobials, antistatic agents, slip agents, anti block agents, coupling agents, dispersants, compatibilizers, oxygen scavengers, acid scavengers, markers, antifogging agents, surface modifiers, flame retardants, blowing agents, smoke suppressors, reinforcement agents, such as glass fibres, carbon fibres and/or glass bubbles, or mixtures of the foregoing additives.

Preferably, the additives are selected from the class of acid scavengers based on salts of long chain carboxylic acids, such as calcium stearate, magnesium stearate, zinc stearate, and calcium lactate, or may be hydrotalcite, from the class of stabilizers based on phenolic antioxidants, benzofuranones, hydroxylamines, nitrones, thiosynergists, and phosphites/phosphonites, from the class of light stabilizers based on hindered amines (HALS), from the class of metal deactivators, from the class of dispersing agents, coupling agents, or compatibilizers, or a mixture of any of the foregoing additives.

Suitable phenolic antioxidants are, for example: Octadecyl-3-(3,5-di-tert-butyl-4-hydroxyphenyl)propanonate, pentaerythritol-tetrakis[3-(3,5-di-tert-butyl-4-hydroxyphenyl)propanoate, tris(3,5-di-tert-butyl-4-hydroxyphenyl)isocyanurate, 1,3,5-trimethyl-2,4,6-tris(3,5-di-tert-butyl-4-hydroxybenzyl)benzene, triethyleneglycol-bis[3-(3-tert-butyl-4-hydroxy-5-methylphenyl)propanoate, N,N'-hexane-1,6-diyl-bis[3-(3,5-di-tert-butyl-4-hydroxyphenyl)propanamide Suitable phosphites/phosphonites are, for example: Tris-(2,4-di-tertbutylphenyl)-phosphite, 3,9-bis(2,4-di-tert-butylphenoxy)-2,4,8,10-tetraoxa-3,9-diphosphaspiro[5.5]undecene, tetrakis(2,4-di-tert-butylphenyl)[1,1-biphenyl]-4,4'-diylbisphosphonite.

Suitable sterically hindered amines are, for example: 1,1-Bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperi-dyl)sebacate, bis(1,2,2,6,6-pentamethyl-4-piperidyl)-n-butyl-3,5-di-tert-butyl-4-hydroxybenzylmalonate, the condensation product of 1-(2-hydroxyethyl)-2,2,6,6-tetramethyl-4-hydroxypiperidine and succinic acid, linear or cyclic condensation products of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)-nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinon), 4-benzoyl-2,2,6,6-tetramethylpiperidine, 4-stearyloxy-2,2,6,6-tetramethylpiperidine, linear or cyclic condensation products of N,N'-bis(2,2,6,6-tetramethyl-4-piperidyl)hexamethylenediamine and 4-morpholino-2,6-dichloro-1,3,5-triazine, the reaction product of 7,7,9,9-tetramethyl-2-cycloundecyl-1-oxa-3,8-diaza-4-oxospiro[4.5]decene and epichlorohydrine.

Suitable dispersants are, for example: Polyacrylates, such as copolymers with long side chains, and polyacrylate block copolymers; alkylamides, such as N,N'-1,2-ethanediylbisoctadecaneamide; sorbitan esters, such as monostearylsorbitan ester, titanates und zirconates; reactive copolymers, such as polypropylene-acrylic acid copolymer; polypropylene-maleic anhydride copolymer; polyethylene-glycidyl-methacrylate copolymer; polystyrol-maleic anhydride-polysiloxane alternating copolymer, such as dimethylsilanediol-ethyleneoxide copolymer; polyphenylsiloxan copolymer, amphiphilic copolymers, such as polyethylene-polyethyl-eneoxide block copolymer, and dendrimers, such as hydroxy containing dendrimers.

A suitable metal deactivator may be, for example, N,N'-bis(3,5-di-tert-butyl-4-hydroxyphenylpropionyl)hydrazine. According to another embodiment, the metal deactivator may be selected from one or more of the following structures:

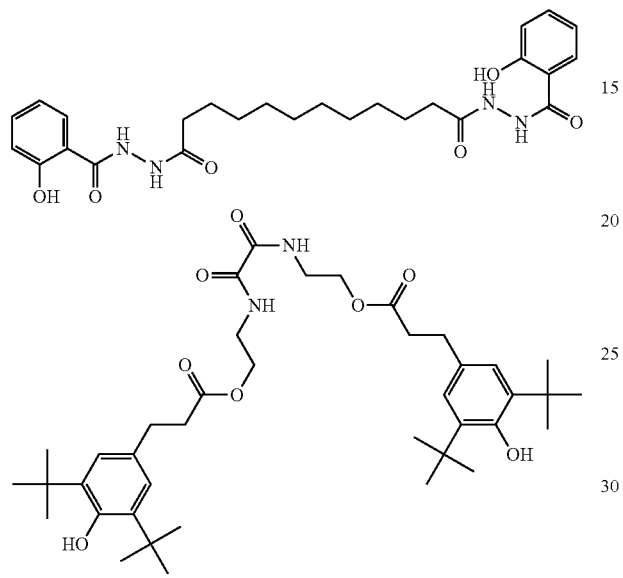

According to a preferred embodiment the breathable film comprises at least one thermoplastic polymer and a surface-treated filler material product, wherein the surface-treated filler material product comprises
A) at least one ground (especially wet ground) calcium carbonate, preferably natural ground calcium carbonate, having
  a weight median particle size $d_{50}$ in the range from 0.25 µm to 5 µm, preferably from 0.7 to 4 µm,
  a top cut particle size $d_{98}$ of ≤10 µm, preferably of ≤7.5 µm,
  a specific surface area (BET) from 0.5 to 35 m²/g, preferably from 0.5 to 15 m²/g as measured using nitrogen and the BET method according to ISO 9277, and
  a residual total moisture content from 0.01 to 0.2 wt.-%, preferably from 0.02 to 0.15 wt.-%, based on the total dry weight of the at least one ground calcium carbonate-comprising filler material, and
B) a treatment layer on the surface of the at least one ground calcium carbonate-comprising filler material comprising,
  i. a phosphoric acid ester blend of one or more phosphoric acid mono-ester and salty reaction products thereof and/or one or more phosphoric acid di-ester and salty reaction products thereof, and/or
  ii. at least one saturated aliphatic linear or branched carboxylic acid and salty reaction products thereof, and/or
  iii. at least one aliphatic aldehyde and/or salty reaction products thereof, and/or
  iv. at least one polydialkylsiloxane, and/or
  v. mixtures of the materials according to i. to iv.,
wherein the surface-treated filler material product comprises the treatment layer in an amount of from 0.1 to 1 wt.-%, preferably from 0.2 to 0.08 wt.-%, based on the total dry weight of the at least one ground calcium carbonate-comprising filler material.

The breathable film of the present invention may be produced by any method known in the art. According to one embodiment, a process of producing a breathable film comprises the steps of:
a) providing a composition comprising at least one thermoplastic polymer and a surface-treated filler material product, and
b) forming a film from the composition of step a), and
c) stretching the film obtained in step b) into at least one direction, wherein the surface-treated filler material product comprises
A) at least one ground (especially wet ground) calcium carbonate-comprising filler material having
  a weight median particle size $d_{50}$ in the range from 0.1 µm to 7 µm,
  a top cut particle size $d_{98}$ of ≤15 µm,
  a specific surface area (BET) from 0.5 to 150 m²/g, as measured using nitrogen and the BET method according to ISO 9277, and
  a residual total moisture content of ≤1 wt.-%, based on the total dry weight of the at least one ground calcium carbonate-comprising filler material, and
B) a treatment layer on the surface of the at least one ground calcium carbonate-comprising filler material comprising
  i. a phosphoric acid ester blend of one or more phosphoric acid mono-ester and salty reaction products thereof and/or one or more phosphoric acid di-ester and salty reaction products thereof, and/or
  ii. at least one saturated aliphatic linear or branched carboxylic acid and salty reaction products thereof, and/or
  iii. at least one aliphatic aldehyde and/or salty reaction products thereof, and/or
  iv. at least one polydialkylsiloxane, and/or
  v. mixtures of the materials according to i. to iv.,
wherein the surface-treated filler material product comprises the treatment layer in an amount of from 0.1 to 3 wt.-%, based on the total dry weight of the at least one ground calcium carbonate-comprising filler material.

The composition of the at least one thermoplastic polymer and the surface-treated filler material product provided in process step a) can be produced by mixing or compounding said components. The at least one thermoplastic polymer and the surface-treated filler material product, and, if present, other optional additives, may be mixed by the use of a suitable mixer, e.g. a Henschel mixer, a super mixer, a tumbler type mixer or the like. The compounding step may be done with a suitable extruder, preferably by a twin screw extruder (co- or counter-rotating) or by any other suitable continuous compounding equipment, e.g. a continuous co-kneader (Buss), a continuous mixer (Farrel Pomini), a ring extruder (Extricom) or the like. The continuous polymer mass from extrusion may be either pelletized by (hot cut) die face pelletizing with underwater pelletizing, eccentric pelletizing and water ring pelletizing or by (cold cut) strand pelletizing with underwater and conventional strand pelletizing to form the extruded polymer mass into pellets.

Optionally, the compounding step may also be performed with a discontinuous or batch process using an internal (batch) mixer, e.g. a Banburry mixer (HF Mixing Group) or a Brabender mixer (Brabender) or the like.

According to an optional embodiment, the composition provided in process step a) further comprises one or more of the additives described above.

According to one embodiment the composition provided in process step a) is a masterbatch. According to a preferred embodiment the masterbatch comprises the surface-treated filler material product in an amount of from 50 to 85 wt.-%, preferably from 60 to 85 wt.-% and more preferably from 70 to 80 wt.-%, based on the total weight of the masterbatch. The masterbatch may be in form of pellets, beads, or granules.

According to one embodiment of the present invention the composition provided in step a) is a masterbatch or a compound obtained by mixing and/or kneading the at least one thermoplastic polymer and the surface-treated filler material product to form a mixture and continuously pelletizing the obtained mixture under water. Continuously means at least 8 hours, preferably at least 24 hours and more preferably more than 170 hours without interruption.

The inventors of the present invention surprisingly found that the use of the surface-treated filler material product of the present invention can avoid the problem of foaming in the water bath during the production of a masterbatch or a compound, which can lead to an interruption of the production process causing a reduced output rate. Thus, the surface-treated filler material product of the present invention can allow the continuous production of masterbatches and compounds, and thereby increases the efficiency of the masterbatch and compound production for breathable films.

The risk of leaching of the surface coating, especially when in contact with human skin, is minimized with the inventive surface coating. Therefore, by using the surface-treated filler material product of the present invention, a breathable film with a reduced potential of skin irritation can be produced.

A filter pressure test was carried out in order to determine the dispersion quality. The filter pressure test was performed on a commercially available Collin Pressure Filter Test Teach-Line FT-E20T-IS. The test method was performed in agreement with European Standard EN 13900-5 with each of the corresponding polymer compositions (16 g effective calcium carbonate per 200 g of final sample, diluent: LLDPE ExxonMobil LL 1001 VX) using a 14 μm type 30 filter (GKD Gebr. Kufferath AG, Düren, Germany), wherein no melt pump was used, the extruder speed was kept at 100 rpm, and wherein the melt temperature was 225 to 230° C. (temperature setting: 190° C./210° C./230° C./230° C./230° C.).

The inventors of the present invention found that the use of the surface-treated filler material product of the present invention in breathable films may result in a very finely and homogenously filled breathable film material. Without being bound to any theory it is believed that the specific properties of the surface-treated filler material product according to the present invention may render it especially suitable for application in breathable films, which require to have the fillers as equally distributed through the film as possible, in order to obtain a uniform distribution barrier and vapour transmission properties throughout the film.

The masterbatch may be used directly in process step b) or may be mixed with one or more thermoplastic polymers before process step b). The masterbatch can also be mixed with one or more of the additives described above. According to a preferred embodiment, the masterbatch is used directly in process step b).

The process step b) may be carried out by any well-known techniques used for preparing polymer films. Examples of suitable film extrusion techniques are blown film extrusion or cast film extrusion.

In process step c) the film obtained in process step b) is stretched into at least one direction. During the stretching step the polymer may be delaminated from the surface of the surface-treated filler material product, whereby pores can be formed in the breathable film. The stretching step c) may be carried out by any means known in the art.

The film can be stretched in at least a uniaxial direction at a temperature of from room temperature to the softening point of the thermoplastic polymer by well-known techniques such as a roll method, an interdigitizing method, or a tenter method.

According to one embodiment, in process step c) the film obtained in step b) is stretched by machine direction orientation (MDO). As known to the skilled person, the MDO process consists of a series of stages such as preheating, orienting, annealing and cooling. Typically, the film enters the MDO and is preheated to the required orientation temperature. In the orienting stage, the film is nipped between a slow and a fast, rotating roller. Depending on the desired film properties, the film can be quenched or annealed after orientation. In the final stage, the film may be cooled to near ambient temperature.

The stretching may be carried out by one step or by several steps. According to one embodiment process step c) is carried out from 1 to 10 times.

Stretch magnification determines film breakage at high stretching as well as breathability and the water vapour transmission of the obtained film, and so excessively high stretch magnification and excessively low stretch magnification are desirably avoided. According to one embodiment, in process step c), the film obtained in step b) is stretched to a stretch magnification from 1.2 to 6 times, more preferably 1.2 to 4 times into at least one direction.

According to one embodiment in step c) of the inventive process, the film obtained in step b) is stretched in two directions. If biaxial stretching is carried out, it is possible that for example stretching in a first direction is applied in the machine direction or a direction perpendicular thereto, and stretching in a second direction is then applied at right angles to the first direction. Alternatively, the biaxial stretching may be carried out simultaneously in the machine direction and the direction perpendicular thereto.

According to one embodiment process step c) is carried out at a temperature of about 30 to 160° C., preferably from 40 to 130° C., more preferably from 45 to 80° C., and most preferably from 50 to 70° C.

After the stretching, a heat setting treatment may be carried out if required in order to stabilize the structure of the breathable film. The heat setting treatment may be, for example, a heat setting treatment at a temperature in the range of from the softening point of the polymer to a temperature less than about the melting point of the polymer for a period of 0.1 to 100 s.

The inventors of the present invention found that the breathable film according to the present invention retains good breathability and low film defect levels. Furthermore, the breathable film may provide good colour properties and good processing characteristics such as low die build-up properties and merely a low pressure increase during the extrusion is observed. The inventive breathable film may be especially suitable for hygiene products such as baby diapers, adult incontinence products, or wound dressings.

The breathable film according to the present invention can be used in many different applications. According to one embodiment, the breathable film is used in hygienic applications, medical applications, healthcare applications, filtration materials, geotextile products, agricultural applications, horticultural applications, clothing, footwear products, baggage products, household applications, industrial applications, packaging applications, building applications, or construction.

According to a further aspect of the present invention, an article comprising a breathable film according to the present invention is provided, wherein the article is selected from the group consisting of hygiene products, medical products, healthcare products, filter products, geotextile products, agriculture products, horticulture products, clothing, footwear products, baggage products, household products, industrial products, packaging products, building products, and construction products.

Preferably, the hygiene products are selected from the group comprising absorbent hygiene products such as baby diapers or nappies, feminine hygiene, adult incontinence products, depilatory strips, bandages and wound dressings, disposable bath and face towels, disposable slippers and footwear, top sheets or coverstocks, consumer face masks, leg cuffs, acquisition/distribution layers, core wraps, back sheets, stretch ears, landing zones, dusting layers and fastening systems; and wipes such as wet wipes, skin care wipes, baby wipes, facial wipes, cleansing wipes, hand and body wipes, moist towelettes, personal hygiene wipes, feminine hygiene wipes, antibacterial wipes and medicated wipes.

Preferably, the medical and healthcare products are selected from the group comprising medical products which can be sterilized, medical packaging, caps like surgical disposable caps, protective clothing, surgical gowns, surgical masks and face masks, surgical scrub suits, surgical covers, surgical drapes, wraps, packs, sponges, dressings, wipes, bed linen, contamination control gowns, examination gowns, lab coats, isolation gowns, transdermal drug delivery, shrouds, underpads, procedure packs, heat packs, ostomy bag liners, fixation tapes, incubator mattress, sterilisation wraps (CSR wrap), wound care, cold/heat packs, drug delivery systems like patches.

Preferably, the clothing, footwear and baggage products are selected from the group comprising interlinings like fronts of overcoats, collars, facings, waistbands, lapels etc., disposable underwear, shoe components like shoelace eyelet reinforcement, athletic shoe and sandal reinforcement and inner sole lining etc., bag components, bonding agents, composition and (wash) care labels.

Preferably, the packaging products are selected from the group comprising interlinings like desiccant packaging, sorbents packaging, gift boxes, file boxes, nonwoven bags, book covers, mailing envelopes, Express envelopes, courier bags and the like.

Preferably, the building and construction products are selected from the group comprising house wrap, asphalt overlay, road and railroad beds, golf and tennis courts, wallcovering backings, acoustical wall coverings, roofing materials and tile underlayment, soil stabilizers and roadway underlayment, foundation stabilizers, erosion control, canals construction, drainage systems, geomembrane protection, frost protection, agriculture mulch, pond and canal water barriers, and sand infiltration barriers for drainage tile.

The scope and interest of the invention will be better understood based on the following examples which are intended to illustrate certain embodiments of the present invention and are non-limitative.

EXAMPLES

1 Measurement Methods and Materials

Figure 1:
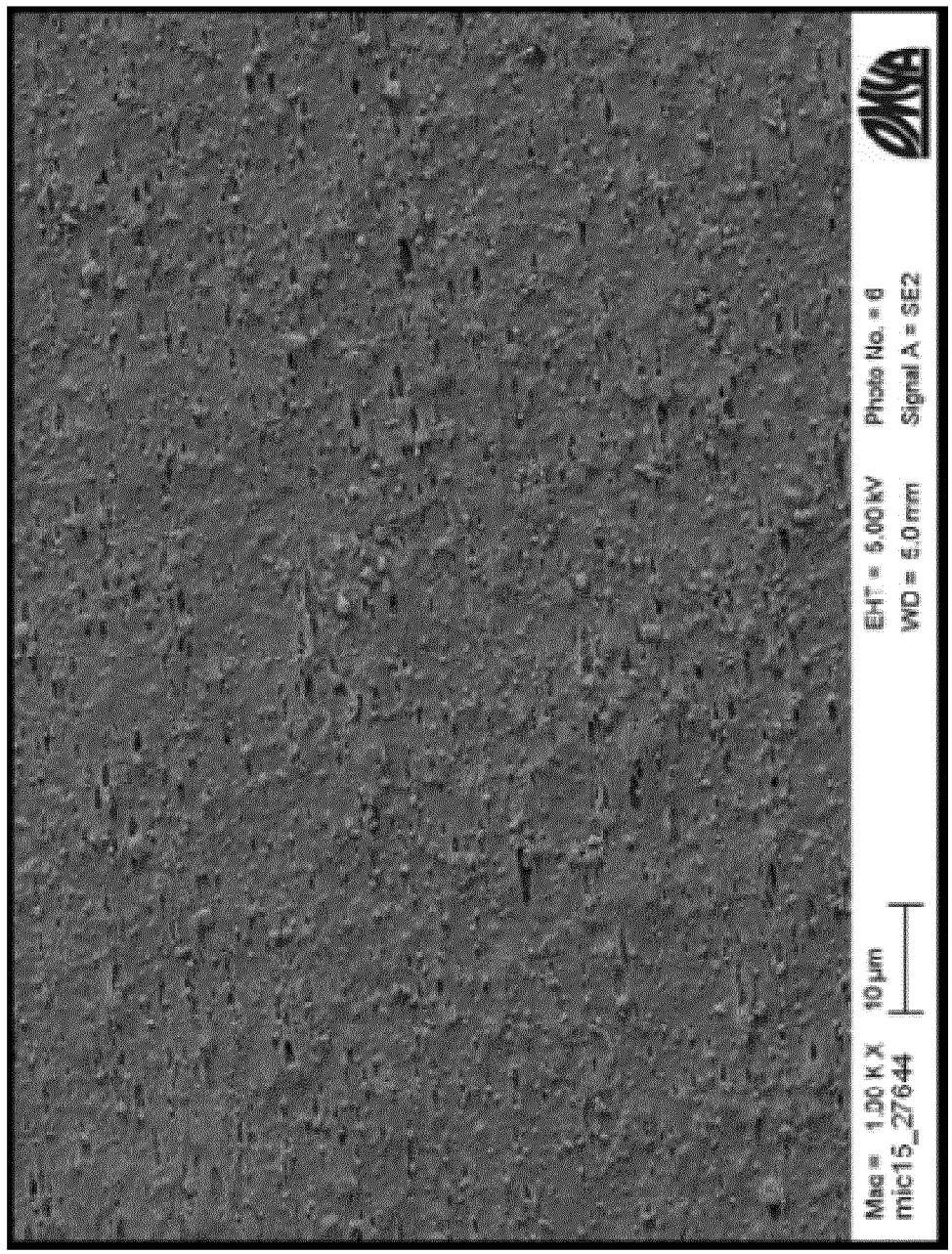
FIG. 1 shows an SEM image of sample 3.

In the following, measurement methods and materials implemented in the examples are described.
Particle Size
The particle distribution of the untreated ground calcium carbonate-comprising filler material was measured using a Sedigraph 5120 from the company Micromeritics, USA. The method and the instruments are known to the skilled person and are commonly used to determine grain size of fillers and pigments. The measurement was carried out in an aqueous solution comprising 0.1 wt.-% $Na_4P_2O_7$. The samples were dispersed using a high speed stirrer and supersonics.
Specific Surface Area (BET)
The specific surface area was measured using nitrogen and the BET method according to ISO 9277.
Ash Content
The ash content in [%] of the masterbatches was determined by incineration of a sample in an incineration crucible which is put into an incineration furnace at 570° C. for 2 hours. The ash content is measured as the total amount of remaining inorganic residues.
Force at Break
Force at break determination was performed according to ISO 527-3. The film specimen width was of 15 mm and the testing length was 5 cm.
Maximum Elongation at Break
Elongation at break determination was performed according to ISO 527-3. The film specimen width was of 15 mm and the testing length was 5 cm.
Tensile E-Modulus (Modulus of Elasticity)
Tensile E-modulus determination was performed according to ISO 527-3. The film specimen width was of 15 mm and the testing length was 5 cm. The E-modulus corresponded to the inclination of the tensile test curve between the points at 0.02% and 2% elongation.
Visual Evaluation of the Film
Film samples have been put under a light microscope. Calcium carbonate agglomerates appear black upon illumination from below and white upon illumination from above.
Water Vapour Transmission Rate (WVTR)
The WVTR value of the breathable films was measured with a Lyssy L80-5000 (PBI-Dansensor A/S, Denmark) measuring device according to ASTM E398.
Hydrostatic Pressure Test (Water Column)
The hydrostatic pressure test has been carried out according to a procedure which is equivalent to AATCC Test Method 127-2013, WSP 80.6 and ISO 811. A film sample (test area=10 $cm^2$) was mounted to form a cover on the test head reservoir. This film sample was subjected to a standardized water pressure, increased at a constant rate until leakage appears on the outer surface of the film, or water burst occurred as a result of film failure (pressure rate gradient=100 mbar/min.). Water pressure was measured as the hydrostatic head height reached at the first sign of leakage in three separate areas of the film sample or when burst occurs. The head height results were recorded in centimetres or millibars of water pressure on the specimen. A higher value indicated greater resistance to water penetration. The TEXTEST FX-3000, Hydrostatic Head Tester (Textest AG, Switzerland), was used for the hydrostatic pressure measurements.

2 Materials

CC1 (inventive): Natural ground calcium carbonate, commercially available from Omya International AG, Switzerland ($d_{50}$: 0.8 µm; $d_{98}$: 3 µm, content of particles<0.5 µm=35%), surface-treated with 2.2 wt.-% stearic acid (commercially available from Sigma-Aldrich, Croda) based on the total weight of the natural ground calcium carbonate. BET: 8.5 $m^2/g$ CC2 (inventive): Natural ground calcium carbonate, commercially available from Omya International AG, Switzerland ($d_{50}$: 1.7 µm; $d_{98}$: 6 µm, content of particles<0.5 µm=12%), surface-treated with 1.0 wt.-% stearic acid (commercially available from Sigma-Aldrich, Croda) based on the total weight of the natural ground calcium carbonate. BET: 3.4 $m^2/g$.

P1: LLDPE Dowlex 2035G (MFR: 6 g/10 min (190° C., 2.16 kg), density: 0.919 $g/cm^3$ according to technical data sheet), commercially available from The Dow Chemical Company, USA.

P2: LDPE Dow SC 7641 (MFR: 2 g/10 min (190° C., 2.16 kg), density: 0.923 $g/cm^3$ according to technical data sheet), commercially available from The Dow Chemical Company, USA.

P3: Polyethylene Elite 5230G (MFR: 4 g/10 min (190° C., 2.16 kg), density: 0.916 $g/cm^3$ according to technical data sheet), commercially available from The Dow Chemical Company, USA.

P4: Polypropylene homopolymer Braskem Polypropylene H358-02 (MFR: 2.1 g/10 min (230° C., 2.16 kg), density: 0.900 $g/cm^3$ according to technical data sheet), commercially available from Braskem Europe GmbH.

3 Examples

Example 1—Preparation of Compounds (CO)

Compounds containing 50 wt.-% CC1 or CC2, respectively, were continuously prepared on a lab scale Buss kneader (PR46 from Buss AG, Switzerland). The obtained compounds were pelletized on a spring load pelletizer, model SLC (Gala, USA) in a water bath having a starting temperature between 20 and 25° C. The compositions and filler contents of the prepared compounds are compiled in Table 1 below. The precise filler content was determined by the ash content.

TABLE 1

Compositions and properties of prepared compounds.

| Compound | Filler | P1 [wt.-%] | P2 [wt.-%] | P3 [wt.-%] | P4 [wt.-%] | Ash content [wt.-%] |
|---|---|---|---|---|---|---|
| CO1 | CC1 | 45 | 5 | — | — | 50.0 |
| CO2 | CC1 | — | — | — | 50 | 49.4 |
| CO3 | CC1 | — | — | 40 | 10 | 50.0 |
| CO4 | CC2 | 45 | 5 | — | — | 50.2 |
| CO5 | CC2 | — | — | — | 50 | 49.9 |
| CO6 | CC2 | — | — | 40 | 10 | 50.5 |

The results shown in Table 1 confirm that compounds with good quality were produced.

Example 2—Preparation of Breathable Films

Breathable films were produced by a pilot-extrusion cast-film line with integrated MDO-II unit (Dr. Collin GmbH, Germany) the extruder temperature settings were 195° C.-210° C.-230° C.-230° C., and the rotation speed of the extruder was approximately 35 rpm and 20 rpm respectively, using the compounds of Example 1. The roller speed of the stretching unit was changed and optimized until a "good" stretched film was achieved.

The film quality of the obtained breathable films was inspected visually and the films were tested regarding their water vapour transmission rate (WVTR) and their hydrostatic pressure. The results are shown in Table 2 below.

TABLE 2

Compositions and properties of prepared breathable films.

| Sample | Extruder speed [rpm] | Compound | Film grammage [$g/m^2$] | Film quality | WVTR [$g/(m^2 \times day)$] | Hydrostatic pressure [mbar] |
|---|---|---|---|---|---|---|
| 1 | 35 | CO1 | 13.1 | ok | 4 400 | 257 |
| 2 | 35 | CO2 | 13.6 | ok | 1 600 | 470 |
| 3 | 35 | CO3 | 13.3 | ok | 3 300 | 208 |
| 4 | 35 | CO4 | 13.1 | ok | 4 200 | 237 |
| 5 | 35 | CO5 | 13.3 | ok | 1 500 | 367 |
| 6 | 35 | CO6 | 13.1 | ok | 3 300 | 175 |
| 7 | 20 | CO1 | 7.1 | ok | 4 400 | 115 |
| 8 | 20 | CO2 | 7.6 | ok | 2 100 | 282 |
| 9 | 20 | CO3 | 7.6 | ok | 3 300 | 123 |
| 10 | 20 | CO4 | 7.6 | ok | 4 200 | 139 |
| 11 | 20 | CO5 | 7.9 | ok | 1 100 | 292 |
| 12 | 20 | CO6 | 7.5 | ok | 3 300 | 87 |

The results shown in Table 2 confirm that the inventive breathable film has a good quality and breathability.

Figure 2:
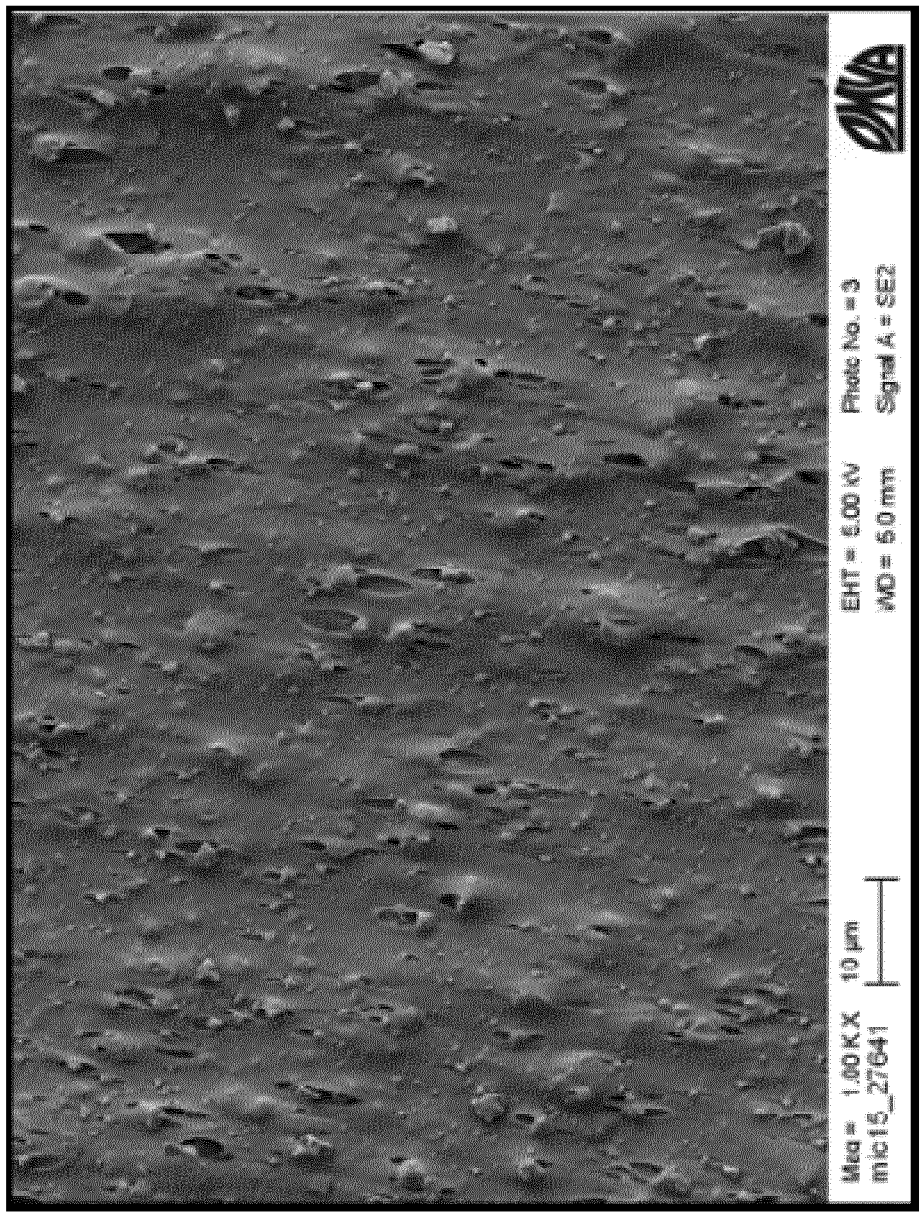
FIG. 2 shows an SEM image of sample 6.
Figure 3:
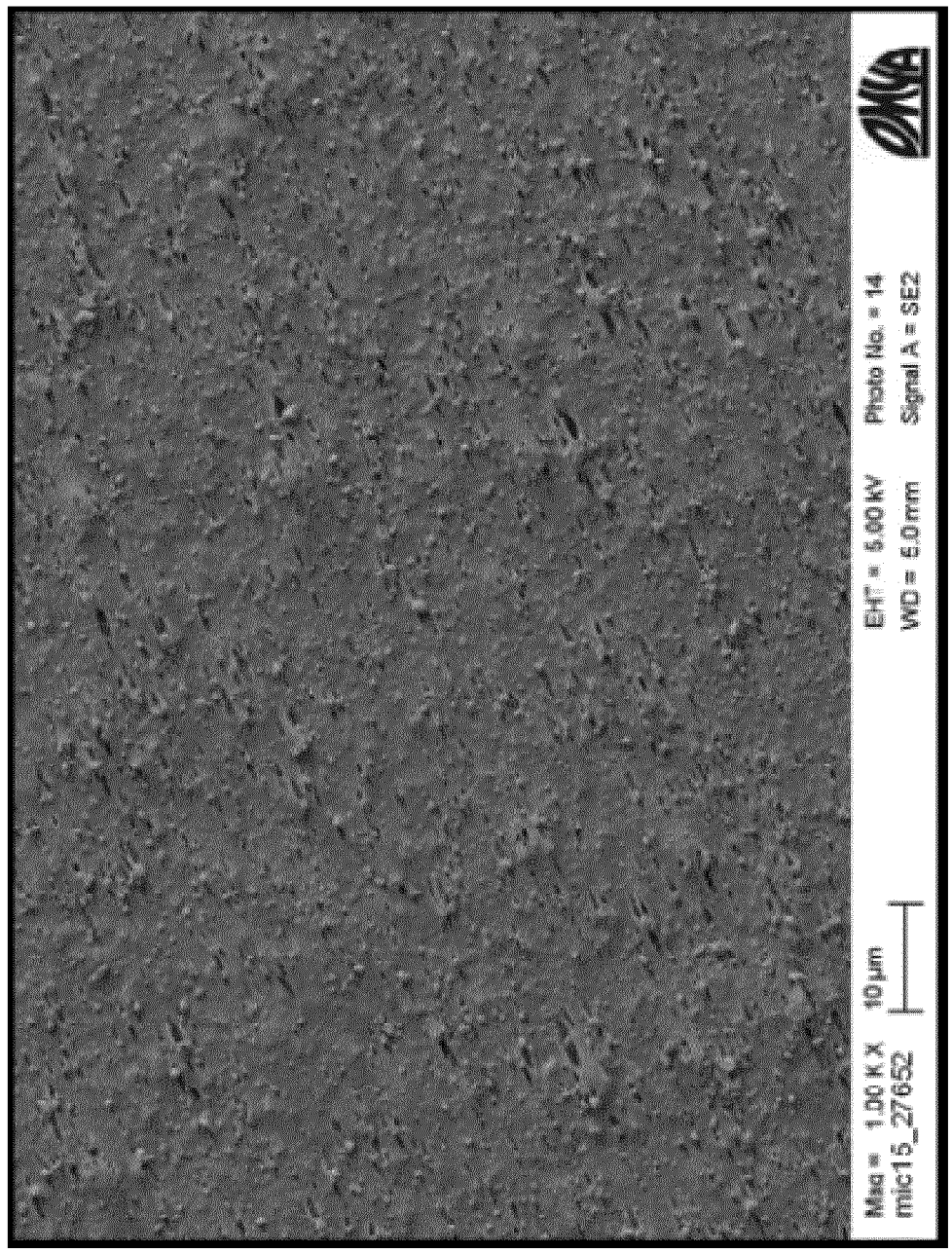
FIG. 3 shows an SEM image of sample 9.
Figure 4:
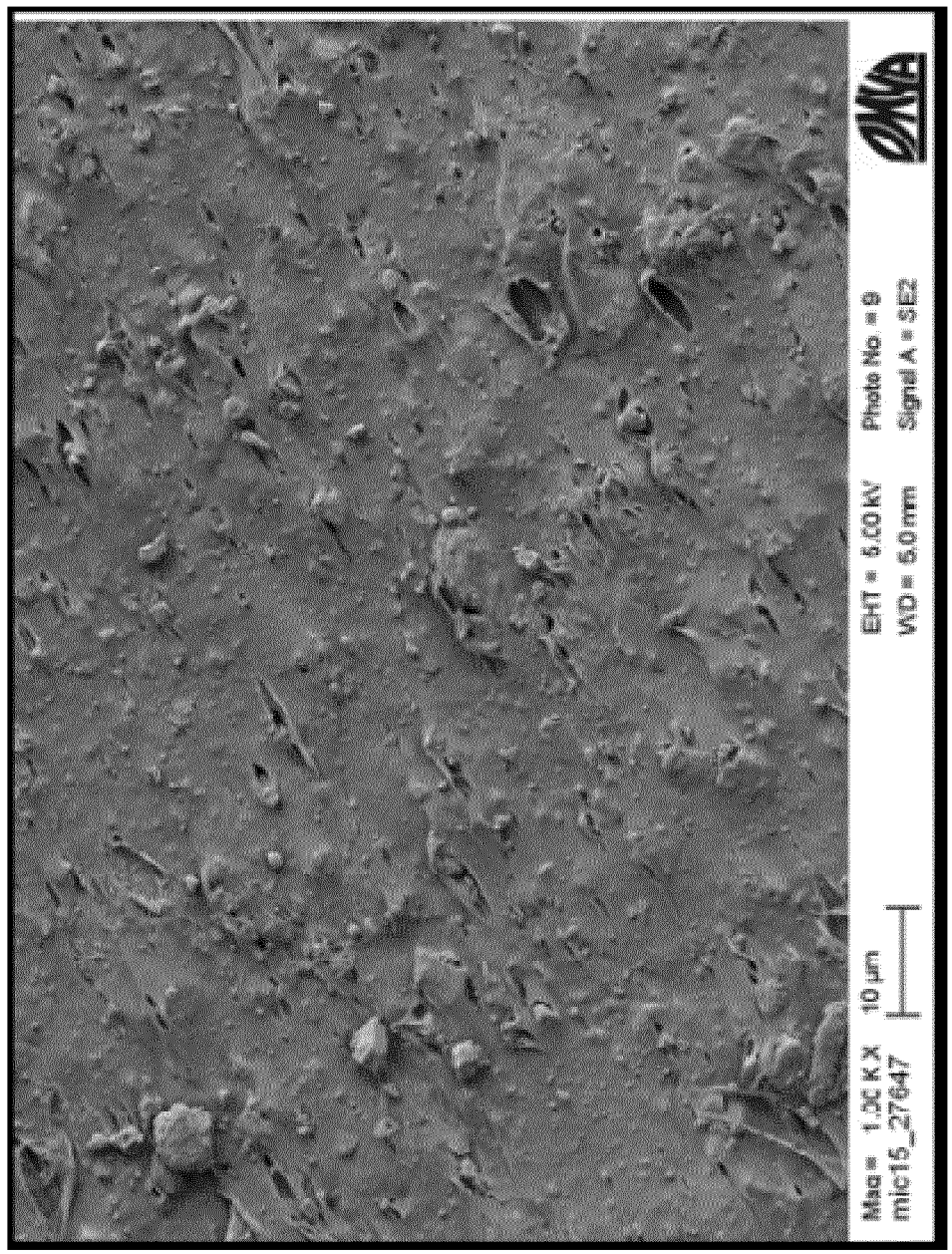
FIG. 4 shows an SEM image of sample 12.

SEM images of the samples 3, 6, 9 and 12 are shown in FIG. 1 to 4.

The mechanical properties, such as the force at break, E-modulus as well as the elongation at break in machine and cross direction, of the obtained breathable films are outlined in Tables 3 and 4.

TABLE 3

Compositions and mechanical properties of prepared breathable films. Film samples taken in machine direction (MD).

| Sample | Extruder speed [rpm] | Compound | Force at break [N] - MD | E-modulus [MPa] - MD | Max. Elongation at break [%] - MD |
|---|---|---|---|---|---|
| 1 | 35 | CO1 | 17 | 550 | 21.4 |
| 2 | 35 | CO2 | 30.3 | 1 763 | 37 |
| 3 | 35 | CO3 | 12.9 | 373 | 64.7 |
| 4 | 35 | CO4 | 11.9 | 371 | 29.8 |
| 5 | 35 | CO5 | 27.6 | 1 099 | 63 |
| 6 | 35 | CO6 | 10.4 | 320 | 81.5 |
| 7 | 20 | CO1 | 11.0 | 712 | 13.1 |
| 8 | 20 | CO2 | 21.9 | 2 157 | 21.3 |
| 9 | 20 | CO3 | 7.8 | 598 | 37.2 |
| 10 | 20 | CO4 | 7.7 | 439 | 13.9 |
| 11 | 20 | CO5 | 15.9 | 1 200 | 22.6 |
| 12 | 20 | CO6 | 5.9 | 360 | 45.3 |

TABLE 4

Compositions and mechanical properties of prepared breathable films. Film samples taken in cross direction (CD).

| Sample | Extruder speed [rpm] | Compound | Force at break [N] - CD | E-modulus [MPa] - CD | Max. Elongation at break [%] - CD |
|---|---|---|---|---|---|
| 1 | 35 | CO1 | 0.67 | 67 | 407 |
| 2 | 35 | CO2 | 2.3 | 313 | 437 |
| 3 | 35 | CO3 | 1.06 | 127 | 480 |
| 4 | 35 | CO4 | 0.69 | 52 | 358 |
| 5 | 35 | CO5 | 2.3 | 301 | 348 |
| 6 | 35 | CO6 | 1.0 | 97 | 461 |
| 7 | 20 | CO1 | 0.34 | 59 | 353 |
| 8 | 20 | CO2 | 1.1 | 253 | 202 |
| 9 | 20 | CO3 | 0.51 | 125 | 463 |
| 10 | 20 | CO4 | 0.32 | 45 | 332 |
| 11 | 20 | CO5 | 1.2 | 234 | 302 |
| 12 | 20 | CO6 | 0.45 | 94 | 331 |

The invention claimed is:

1. A breathable film having a basis weight from 1 g/m² to 10 g/m², the breathable film comprising at least one thermoplastic polymer and a surface-treated filler material product, wherein the surface-treated filler material product comprises
   A) at least one ground calcium carbonate-comprising filler material having
      a weight median particle size $d_{50}$ in the range from 0.1 µm to 7 µm,
      a top cut particle size $d_{98}$ of ≤15 µm,
      a fineness such that at least 65 wt.-%, of all particles have a particle size of <1 µm,
      a specific surface area (BET) from 0.5 m²/g to 150 m²/g, as measured using nitrogen and the BET method according to ISO 9277, and
      a residual total moisture content of ≤1 wt.-%, based on the total dry weight of the at least one ground calcium carbonate-comprising filler material, and
   B) a treatment layer on the surface of the at least one ground calcium carbonate-comprising filler material comprising
      i. a phosphoric acid ester blend of one or more phosphoric acid mono-ester and salty reaction products thereof and/or one or more phosphoric acid di-ester and salty reaction products thereof, and/or
      ii. at least one saturated aliphatic linear or branched carboxylic acid and salty reaction products thereof, and/or
      iii. at least one aliphatic aldehyde and/or salty reaction products thereof, wherein the at least one saturated aliphatic linear or branched carboxylic acid is selected from the group consisting of carboxylic acids consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid and mixtures thereof, and/or
      iv. at least one polydialkylsiloxane, and/or
      v. mixtures of the materials according to i. to iv.,
   wherein the surface-treated filler material product comprises the treatment layer in an amount of from 0.1 wt.-% to 3 wt.-%, based on the total dry weight of the at least one ground calcium carbonate-comprising filler material.

2. The breathable film of claim 1, wherein the at least one ground calcium carbonate-comprising filler material is a wet ground calcium carbonate-comprising filler material.

3. The breathable film of claim 1, wherein the at least one thermoplastic polymer is a polyolefin.

4. The breathable film of claim 1, wherein the breathable film comprises the surface-treated filler material product in an amount from 1 wt.-% to 85 wt.-%, based on the total weight of the breathable film.

5. The breathable film of claim 1, wherein the at least one ground calcium carbonate-comprising filler material is natural ground calcium carbonate, precipitated calcium carbonate, modified calcium carbonate, surface-treated calcium carbonate, or a mixture thereof.

6. The breathable film of claim 1, wherein the at least one ground calcium carbonate-comprising filler material has
   a) a weight median particle size $d_{50}$ from 0.25 µm to 5 µm, and/or
   b) a top cut particle size $d_{98}$ of ≤12.5 µm, and/or
   c) a fineness such that at least 65 wt. %, 70 wt.-%, of all particles have a particle size of <1 µm.

7. The breathable film of claim 1, wherein the at least one ground calcium carbonate-comprising filler material has a specific surface area (BET) of from 0.5 m²/g to 50 m²/g, as measured using nitrogen and the BET method according to ISO 9277.

8. The breathable film of claim 1, wherein the at least one ground calcium carbonate-comprising filler material has a residual total moisture content of from 0.01 wt.-% to 0.2 wt.-%, based on the total dry weight of the at least one ground calcium carbonate-comprising filler material.

9. The breathable film of claim 1, wherein the surface-treated filler material product also has a moisture pick-up from 0.1 mg/g to 1 mg/g, at a temperature of 23° C. (±2° C.).

10. The breathable film of claim 1, wherein the surface-treated filler material product also has a volatile onset temperature of ≥250° C.

11. The breathable film of claim 1, wherein the film has a basis weight from 5 to 10 g/m².

12. A process for producing a breathable film having a basis weight from 1 g/m² to 10 g/m², the process comprising the steps of:
   a) providing a composition comprising at least one thermoplastic polymer and a surface-treated filler material product, and
   b) forming a film from the composition of step a), and
   c) stretching the film obtained in step b) into at least one direction, wherein the surface-treated filler material product comprises:
   A) at least one ground calcium carbonate-comprising filler material having
      a weight median particle size $d_{50}$ in the range from 0.1 µm to 7 µm,
      a top cut particle size $d_{98}$ of ≤15 µm,
      a fineness such that at least 65 wt. %, of all particles have a particle size of <1 µm,
      a specific surface area (BET) from 0.5 to 150 m²/g, as measured using nitrogen and the BET method according to ISO 9277, and
      a residual total moisture content of 1 wt. %, based on the total dry weight of the at least one ground calcium carbonate-comprising filler material,
   and
   B) a treatment layer on the surface of the at least one ground calcium carbonate-comprising filler material comprising
      i. a phosphoric acid ester blend of one or more phosphoric acid mono-ester and salty reaction products thereof and/or one or more phosphoric acid diester and salty reaction products thereof, and/or
      ii. at least one saturated aliphatic linear or branched carboxylic acid and salty reaction products thereof, wherein the at least one saturated aliphatic linear or branched carboxylic acid is selected from the group consisting of carboxylic acids consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid and mixtures thereof, and/or
      iii. at least one aliphatic aldehyde and/or salty reaction products thereof, and/or
      iv. at least one polydialkylsiloxane, and/or
      v. mixtures of the materials according to i. to iv.,
      wherein the surface-treated filler material product comprises the treatment layer in an amount of from 0.1 to 3 wt. %, based on the total dry weight of the at least one ground calcium carbonate-comprising filler material.

13. The process of claim 12, wherein the composition provided in step a) is a masterbatch or a compound obtained by mixing and/or kneading the at least one thermoplastic polymer and the surface-treated filler material product to form a mixture and continuously pelletizing the obtained mixture under water.

14. An article comprising the breathable film having a basis weight from 1 g/m² to 10 g/m² according to claim 1, wherein the article is selected from the group consisting of hygiene products, medical products, healthcare products, filter products, geotextile products, agriculture products, horticulture products, clothing, footwear products, baggage products, household products, industrial products, packaging products, building products, and construction products.

15. The breathable film of claim 3, wherein the at least one thermoplastic polymer is selected from the group consisting of polypropylene, polyethylene, polybutylene, and mixtures thereof.

16. The breathable film of claim 3, wherein the at least one thermoplastic polymer is selected from the group consisting of high density polyethylene (HDPE), linear low density polyethylene (LLDPE), low density polyethylene (LDPE), ultra-low density polyethylene (ULDPE), very low density polyethylene (VLDPE), and mixtures thereof.

17. The breathable film of claim 4, wherein the surface-treated filler material product is present in an amount from 2 wt.-% to 80 wt.-%.

18. The breathable film of claim 4, wherein the surface-treated filler material product is present in an amount from 5 wt.-% to 75 wt.-%.

19. The breathable film of claim 4, wherein the surface-treated filler material product is present in an amount from 10 wt.-% to 65 wt.-%.

20. The breathable film of claim 4, wherein the surface-treated filler material product is present in an amount from 15 wt.-% to 60 wt.-%.

21. The breathable film of claim 5, wherein the at least one ground calcium carbonate-comprising filler material is natural ground calcium carbonate.

22. The breathable film of claim 6, wherein the weight medium particle size $d_{50}$ is from 0.5 µm to 4 µm.

23. The breathable film of claim 6, wherein the weight medium particle size $d_{50}$ is from 0.6 µm to 1 µm.

24. The breathable film of claim 6, wherein the top cut particle size $d_{98}$ is <10 µm.

25. The breathable film of claim 6, wherein the top cut particle size $d_{98}$ is <7.5 µm.

26. The breathable film of claim 6, wherein the top cut particle size $d_{98}$ is <3 µm.

27. The breathable film of claim 6, wherein the fineness is such that at least 70 wt.-% of all particles have a particle size of <1 µm.

28. The breathable film of claim 6, wherein the fineness is such that at least 75 wt.-% of all particles have a particle size of <1 µm.

29. The breathable film of claim 6, wherein the fineness is such that at least 80 wt.-% of all particles have a particle size of <1 µm.

30. The breathable film of claim 7, wherein the specific surface area (BET) is from 0.5 m²/g to 35 m²/g.

31. The breathable film of claim 7, wherein the specific surface area (BET) is from 0.5 m²/g to 15 m₂/g.

32. The breathable film of claim 8, wherein the residual total moisture content is from 0.02 wt. % to 0.15 wt. %.

33. The breathable film of claim 8, wherein the residual total moisture content is from 0.04 wt.-% to 0.15 wt.-%.

34. The breathable film of claim 9, wherein the moisture pick-up is from 0.2 mg/g to 0.9 mg/g.

35. The breathable film of claim 9, wherein the moisture pick-up is from 0.2 mg/g to 0.8 mg/g.

36. The breathable film of claim 10, wherein the volatile onset temperature is ≥260° C.

37. The breathable film of claim 10, wherein the volatile onset temperature is ≥270° C.

38. The breathable film of claim 11, wherein the basis weight is from 6 g/m² to 10 g/m².

39. The breathable film of claim 11, wherein the basis weight is from 7 g/m² to 9 g/m².

40. The breathable film of claim 11, wherein the basis weight is about 8 g/m².

\* \* \* \* \*